United States Patent
Katagiri

(10) Patent No.: US 9,241,203 B2
(45) Date of Patent: Jan. 19, 2016

(54) APPARATUS FOR CONTROLLING A TRANSMISSION PATH

(71) Applicant: FUJITSU LIMITED, Kawasaki-shi, Kanagawa (JP)

(72) Inventor: Toru Katagiri, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 13 days.

(21) Appl. No.: 14/255,126

(22) Filed: Apr. 17, 2014

(65) Prior Publication Data

US 2014/0321849 A1    Oct. 30, 2014

(30) Foreign Application Priority Data

Apr. 30, 2013 (JP) .................................. 2013-095515

(51) Int. Cl.
| H04J 14/00 | (2006.01) |
|---|---|
| H04Q 11/00 | (2006.01) |
| H04J 14/02 | (2006.01) |

(52) U.S. Cl.
CPC ........ *H04Q 11/0005* (2013.01); *H04J 14/0201* (2013.01); *H04Q 2011/0016* (2013.01); *H04Q 2011/0083* (2013.01)

(58) Field of Classification Search
CPC .................... H04Q 11/005; H04Q 2011/0016; H04Q 2011/0083; H04J 14/0201
See application file for complete search history.

(56) References Cited

U.S. PATENT DOCUMENTS

| 6,314,097 B1* | 11/2001 | Ohara | H04J 3/085 370/392 |
|---|---|---|---|
| 7,013,084 B2* | 3/2006 | Battou | G06F 8/65 398/45 |
| 8,786,414 B2* | 7/2014 | Nakajima | G08C 17/02 340/12.22 |
| 2003/0118272 A1* | 6/2003 | Tsushima | H04J 14/0227 385/16 |
| 2004/0141465 A1* | 7/2004 | Jo | H04L 41/12 370/252 |
| 2004/0141757 A1* | 7/2004 | Sato | H04Q 11/0005 398/161 |

FOREIGN PATENT DOCUMENTS

| JP | 2004-129054 | 4/2004 |
|---|---|---|
| JP | 2012-49674 | 3/2012 |

OTHER PUBLICATIONS

N. McKeown et al., "OpenFlow: Enabling Innovation in Campus Networks," *ACM SIGCOMM Computer Communication Review*, vol. 38, No. 2, Apr. 2008, pp. 69-74.

(Continued)

*Primary Examiner* — Danny Leung
(74) *Attorney, Agent, or Firm* — Staas & Halsey LLP

(57) ABSTRACT

An apparatus includes a switch unit configured to switch signal paths between a plurality of input ports and a plurality of output ports. The apparatus controls the signal paths according to the connection setting information stored in the apparatus. The connection setting information includes first and second connection information. The first connection setting information specifies a first output port to which a signal input via an input port is to be output, in association with identification information identifying the signal, and the second connection setting information specifies a second output port to which the signal is to be alternatively output. The apparatus controls setting of a signal path of the switch unit, based on the second connection setting information in a case where another signal path has been already allocated to the first output port specified by the first connection setting information.

12 Claims, 25 Drawing Sheets

(56) References Cited

OTHER PUBLICATIONS

S. Das et al., "Unifying Packet and Circuit Switched Networks," IEEE, Nov. 2009, 6 pages.

S. Das et al., "Packet and Circuit Network Convergence with OpenFlow", IEEE, OSA/OFC/NFOEC 2010, Mar. 2010, 3 pages.

V. Gudla et al., "Experimental Demonstration of OpenFlow Control of Packet and Circuit Switches," IEEE, OSA/OFC/NFOEC 2010, Mar. 2010, 3 pages.

* cited by examiner

FIG. 10A 34, 341

| CURRENT NODE | DESTINATION NODE | | | | | | | |
|---|---|---|---|---|---|---|---|---|
| | | a | b | c | d | e | f | g |
| | a | — | p1a | p3a | p2a | p1a | p1a | p2a | ← DESCRIPTION OF NODE a IN STORAGE UNIT |
| | b | p1b | — | p1b | p1b | p2b | p1b | p2b | ← DESCRIPTION OF NODE b IN STORAGE UNIT |
| | c | p1c | p1c | — | p1c | p1c | p2c | p2c | ← DESCRIPTION OF NODE c IN STORAGE UNIT |
| | d | p1d | p1d | p1d | — | p2d | p3d | p3d | ← DESCRIPTION OF NODE d IN STORAGE UNIT |
| | e | p1e | p1e | p2e | p2e | — | p3e | p2e | ← DESCRIPTION OF NODE e IN STORAGE UNIT |
| | f | p1f | p1f | p2f | p1f | p1f | — | p2f | ← DESCRIPTION OF NODE f IN STORAGE UNIT |
| | g | p2g | p2g | p1g | p2g | p2g | p3g | — | ← DESCRIPTION OF NODE g IN STORAGE UNIT |

IN TABLE, VALUES DENOTE OUTPUT PORTS

SETTING OF OUTPUT PORTS FOR NEW PATH

COLLISION AT OUTPUT PORT

OUTPUT PORTS ASSIGNED TO EXISTING PATHS

FIG. 10B 35, 351

| CURRENT NODE | DESTINATION NODE | | | | | | | |
|---|---|---|---|---|---|---|---|---|
| | | a | b | c | d | e | f | g |
| | a | — | p2a | p2a | p1a | p2a | p2a | p3d | ← DESCRIPTION OF NODE a IN SECOND STORAGE UNIT |
| | b | p2b | — | p2c | p2b | p1b | p1b | p2b | ← DESCRIPTION OF NODE b IN SECOND STORAGE UNIT |
| | c | p2c | p2c | — | p2c | p2c | p1c | p1c | ← DESCRIPTION OF NODE c IN SECOND STORAGE UNIT |
| | d | p2d | p2d | p3d | — | p1d | p3d | p1d | ← DESCRIPTION OF NODE d IN SECOND STORAGE UNIT |
| | e | p2e | p2e | p3e | p1e | — | p1e | p3e | ← DESCRIPTION OF NODE e IN SECOND STORAGE UNIT |
| | f | p2f | p2f | p1f | p2f | p2f | — | p1f | ← DESCRIPTION OF NODE f IN SECOND STORAGE UNIT |
| | g | p1g | p3g | p2g | p1g | p3g | p2g | — | ← DESCRIPTION OF NODE g IN SECOND STORAGE UNIT |

IN TABLE, VALUES DENOTE OUTPUT PORTS

FIG. 12A 34, 341

|  |  | DESTINATION NODE | | | | | | |
|--|--|--|--|--|--|--|--|--|
|  |  | a | b | c | d | e | f | g |
| CURRENT NODE | a | --- | p1a | p3a | ✗ | p1a | p1a | p2a |
|  | b | p1b | --- | p1b | p1b | p2b | p2b | p2b |
|  | c | p1c | p1c | --- | p1c | p1c | p2c | p2c |
|  | d | p1d | p1d | p1d | --- | p2d | p3d | p3d |
|  | e | p1e | p1e | p2e | p2e | --- | p3e | p2e |
|  | f | p1f | p1f | p2f | p1f | p1f | --- | p2f |
|  | g | p2g | p2g | p1g | p2g | p2g | p3g | --- |

FIG. 12B 35, 351

|  |  | DESTINATION NODE | | | | | | |
|--|--|--|--|--|--|--|--|--|
|  |  | a | b | c | d | e | f | g |
| CURRENT NODE | a | --- | p2a | p2a | p1a | p2a | p2a | p3a |
|  | b | p2b | --- | p2b | p2b | p1b | p1b | p2b |
|  | c | p2c | p2c | --- | p2c | p2c | p1c | p1c |
|  | d | p2d | p2d | p3d | --- | p1d | p3d | p1d |
|  | e | p2e | p2e | p3e | p1e | --- | p1e | p3e |
|  | f | p2f | p2f | p1f | p2f | p2f | --- | p1f |
|  | g | p1g | p3g | p2g | p1g | p3g | p2g | --- |

FIG. 14A 34, 341

|  |  | DESTINATION NODE | | | | | | |
|---|---|---|---|---|---|---|---|---|
|  |  | a | b | c | d | e | f | g |
| CURRENT NODE | a | --- | p1a | p3a | ✗ | p1a | p1a | p2a |
|  | b | p1b | --- | p1b | p1b | p2b | p2b | p2b |
|  | c | p1c | p1c | --- | p1c | p1c | p2c | p2c |
|  | d | p1d | p1d | p1d | --- | p2d | p3d | p3d |
|  | e | p1e | p1e | p2e | p2e | --- | p3e | p2e |
|  | f | p1f | p1f | p2f | p1f | p1f | --- | p2f |
|  | g | p2g | p2g | p1g | p2g | p2g | p3g | --- |

FIG. 14B 35, 351

|  |  | DESTINATION NODE | | | | | | |
|---|---|---|---|---|---|---|---|---|
|  |  | a | b | c | d | e | f | g |
| CURRENT NODE | a | --- | p2a | p2a | p1a | p2a | p2a | p3d |
|  | b | p2b | --- | p2b | p2b | p1b | p1b | p2b |
|  | c | p2c | p2c | --- | p2c | p2c | p1c | p1c |
|  | d | p2d | p2d | p3d | --- | p1d | p3d | p1d |
|  | e | p2e | p2e | p3e | p1e | --- | p1e | p3e |
|  | f | p2f | p2f | p1f | p2f | p2f | --- | p1f |
|  | g | p1g | p3g | p2g | p1g | p3g | p2g | --- |

FIG. 16A 34, 341

| | | DESTINATION NODE | | | | | | |
|---|---|---|---|---|---|---|---|---|
| | | a | b | c | d | e | f | g |
| CURRENT NODE | a | --- | p1a | p3a | [X] | p1a | p1a | p2a |
| | b | p1b | --- | p1b | [X] | p2b | p2b | p2b |
| | c | p1c | p1c | --- | p1c | p1c | p2c | p2c |
| | d | p1d | p1d | p1d | --- | p2d | p3d | p3d |
| | e | p1e | p1e | p2e | p2e | --- | p3e | p2e |
| | f | p1f | p1f | p2f | p1f | p1f | --- | p2f |
| | g | p2g | p2g | p1g | p2g | p2g | p3g | --- |

FIG. 16B 35, 351

| | | DESTINATION NODE | | | | | | |
|---|---|---|---|---|---|---|---|---|
| | | a | b | c | d | e | f | g |
| CURRENT NODE | a | --- | p2a | p2a | p1a | p2a | p2a | p3d |
| | b | p2b | --- | p2b | p2b | p1b | p1b | p2b |
| | c | p2c | p2c | --- | p2c | p2c | p1c | p1c |
| | d | p2d | p2d | p3d | --- | p1d | p3d | p1d |
| | e | p2e | p2e | p3e | p1e | --- | p1e | p3e |
| | f | p2f | p2f | p1f | p2f | p2f | --- | p1f |
| | g | p1g | p3g | p2g | p1g | p3g | p2g | --- |

FIG. 22A 34, 341

COLLISION AT OUTPUT PORT ASSIGNED TO EXISTING PATH BETWEEN NODES b AND e

OUTPUT PORT ASSIGNED TO EXISTING PATH BETWEEN NODES f AND e

OUTPUT PORTS ASSIGNED TO EXISTING PATH BETWEEN NODES a AND g

|  |  | DESTINATION NODE | | | | | | |
|---|---|---|---|---|---|---|---|---|
|  |  | a | b | c | d | e | f | g |
| CURRENT NODE | a | --- | p1a | p3a | p1a | p1a | p1a | p2a |
|  | b | p1b | --- | p1b | p1b | p2b | p2b | p2b |
|  | c | p1c | p1c | --- | p1c | p1c | p2c | p2c |
|  | d | p1d | p1d | p1d | --- | p2d | p3d | p3d |
|  | e | p1e | p1e | p2e | p2e | --- | p3e | p2e |
|  | f | p1f | p1f | p2f | p1f | p1f | --- | p2f |
|  | g | p2g | p2g | p1g | p1g | p2g | p3g | --- |

COLLISION AT OUTPUT PORT → SETTING OF OUTPUT PORT FOR NEW PATH

→ DESCRIPTION OF Node a IN STORAGE UNIT
→ DESCRIPTION OF Node b IN STORAGE UNIT
→ DESCRIPTION OF Node c IN STORAGE UNIT
→ DESCRIPTION OF Node d IN STORAGE UNIT
→ DESCRIPTION OF Node e IN STORAGE UNIT
→ DESCRIPTION OF Node f IN STORAGE UNIT
→ DESCRIPTION OF Node g IN STORAGE UNIT

FIG. 22B 35, 351

|  |  | DESTINATION NODE | | | | | | |
|---|---|---|---|---|---|---|---|---|
|  |  | a | b | c | d | e | f | g |
| CURRENT NODE | a | --- | p2a | p2a | p1a | p2a | p2a | p3d |
|  | b | p2b | --- | p2b | p1b | p1b | p1b | p2b |
|  | c | p2c | p2c | --- | p2c | p2c | p1c | p1c |
|  | d | p2d | p2d | p3d | --- | p1d | p3d | p1d |
|  | e | p2e | p2e | p3e | p1e | --- | p1e | p3e |
|  | f | p2f | p1f | p1f | p2f | p2f | --- | p1f |
|  | g | p1g | p1g | p2g | p1g | p3g | p2g | --- |

COLLISION AT OUTPUT PORT

→ DESCRIPTION OF Node a IN SECOND STORAGE UNIT
→ DESCRIPTION OF Node b IN SECOND STORAGE UNIT
→ DESCRIPTION OF Node c IN SECOND STORAGE UNIT
→ DESCRIPTION OF Node d IN SECOND STORAGE UNIT
→ DESCRIPTION OF Node e IN SECOND STORAGE UNIT
→ DESCRIPTION OF Node f IN SECOND STORAGE UNIT
→ DESCRIPTION OF Node g IN SECOND STORAGE UNIT

FIG. 24A 34, 341

SETTING OF OUTPUT PORTS FOR NEW PATH

OUTPUT PORTS ASSIGNED TO EXISTING PATH BETWEEN NODES b AND e

OUTPUT PORTS ASSIGNED TO EXISTING PATH BETWEEN NODES a AND g

| CURRENT NODE | DESTINATION NODE | | | | | | | |
|---|---|---|---|---|---|---|---|---|
| | | a | b | c | d | e | f | g |
| | a | --- | p1a | p3a | p2a | p1a | p1a | p2a | ← DESCRIPTION OF Node a IN STORAGE UNIT |
| | b | p1b | --- | p1b | p1b | p2b | p2b | p2b | ← DESCRIPTION OF Node b IN STORAGE UNIT |
| | c | p1c | p1c | --- | p2c | p1c | p2c | p2c | ← DESCRIPTION OF Node c IN STORAGE UNIT |
| | d | p1d | p1d | p1d | --- | p2d | p3d | p3d | ← DESCRIPTION OF Node d IN STORAGE UNIT |
| | e | p1e | p1e | p2e | p2e | --- | p3e | p2e | ← DESCRIPTION OF Node e IN STORAGE UNIT |
| | f | p1f | p1f | p2f | p1f | p1f | --- | p2f | ← DESCRIPTION OF Node f IN STORAGE UNIT |
| | g | p2g | p2g | p1g | p3g | p2g | p3g | --- | ← DESCRIPTION OF Node g IN STORAGE UNIT |

FIG. 24B 35, 351

| CURRENT NODE | DESTINATION NODE | | | | | | | |
|---|---|---|---|---|---|---|---|---|
| | | a | b | c | d | e | f | g |
| | a | --- | p2a | p2a | n/a | p2a | p2a | p3d | ← DESCRIPTION OF Node a IN SECOND STORAGE UNIT |
| | b | p2b | --- | p2b | n/a | p1b | p1b | p2b | ← DESCRIPTION OF Node b IN SECOND STORAGE UNIT |
| | c | p2c | p2c | --- | n/a | p2c | p1c | p1c | ← DESCRIPTION OF Node c IN SECOND STORAGE UNIT |
| | d | p2d | p2d | p3d | --- | p1d | p3d | p1d | ← DESCRIPTION OF Node d IN SECOND STORAGE UNIT |
| | e | p2e | p2e | p3e | n/a | --- | p1e | p3e | ← DESCRIPTION OF Node e IN SECOND STORAGE UNIT |
| | f | p2f | p2f | p1f | n/a | p2f | --- | p1f | ← DESCRIPTION OF Node f IN SECOND STORAGE UNIT |
| | g | p3g | p3g | p2g | n/a | p3g | p2g | --- | ← DESCRIPTION OF Node g IN SECOND STORAGE UNIT |

APPARATUS FOR CONTROLLING A TRANSMISSION PATH

CROSS-REFERENCE TO RELATED APPLICATION

This application is based upon and claims the benefit of priority from the prior Japanese Patent Application No. 2013-095515 filed on Apr. 30, 2013, the entire contents of which are incorporated herein by reference.

FIELD

The embodiments discussed herein are related to an apparatus for controlling a transmission path.

BACKGROUND

A network using packet communication includes a path control apparatus and a packet communication apparatus. The packet communication apparatus includes a switch unit that switches a destination of each packet and a signal transfer unit. The path control apparatus calculates, using a path calculation unit, an end-to-end path from a source to a destination for each packet.

Based on a result of the path calculation performed by the path calculation unit, the path control apparatus performs setting for switching control of switch units or signal transfer units provided for a plurality of packet communication apparatuses located on the network. This technique is called Open-Flow.

Descriptions of techniques associated with the path control may be found, for example, in Japanese Laid-open Patent Publication No. 2012-49674, and Japanese Laid-open Patent Publication No. 2004-129054.

SUMMARY

According to an aspect of the invention, an apparatus includes a switch unit configured to switch signal paths between a plurality of input ports and a plurality of output ports. The apparatus controls the signal paths according to the connection setting information stored in the apparatus. The connection setting information includes first and second connection information. The first connection setting information specifies a first output port to which a signal input via an input port is to be output, in association with identification information identifying the signal, and the second connection setting information specifies a second output port to which the signal is to be alternatively output. The apparatus controls setting of a signal path of the switch unit, based on the second connection setting information in a case where another signal path has been already allocated to the first output port specified by the first connection setting information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 10A and 10B are diagrams illustrating examples of information stored in first and second storage units of an optical transmission apparatus illustrated by way of example in FIG. 6, according to an embodiment;

FIGS. 12A and 12B are diagrams illustrating examples of information stored in first and second storage units wherein the information corresponds to a network topology illustrated by way of example in FIG. 11, according to an embodiment;

FIGS. 14A and 14B are diagrams illustrating examples of information stored in first and second storage units wherein the information corresponds to a network topology illustrated by way of example in FIG. 13, according to an embodiment;

FIGS. 16A and 16B are diagrams illustrating examples of information stored in first and second storage units wherein the information corresponds to a network topology illustrated by way of example in FIG. 15, according to an embodiment;

FIGS. 22A and 22B are diagrams illustrating examples of information stored in first and second storage units wherein the information corresponds to a network topology illustrated by way of example in FIG. 21, according to an embodiment;

FIGS. 24A and 24B are diagrams illustrating examples of information stored in first and second storage units wherein the information corresponds to a network topology illustrated by way of example in FIG. 23, according to an embodiment.

DESCRIPTION OF EMBODIMENTS

There is a possibility that connection setting information associated with a switch unit or a signal transfer unit of a transmission apparatus, such as a packet communication apparatus or an optical transmission apparatus, is set such that a plurality of different input ports are connected to the same output port. In this case, if a path corresponding to the connection setting information described above is input by mistake to the transmission apparatus, path blocking occurs. An occurrence of such blocking may cause a communication failure (a telephone call loss).

Embodiments are described below with reference to drawings. Note that the embodiments described below are only for purpose of illustration of examples but not for limitation and not for excluding various modifications or applications not described below. Note that in drawings referred to in describing embodiments, like reference symbols denote like elements unless otherwise stated.

Figure 1:
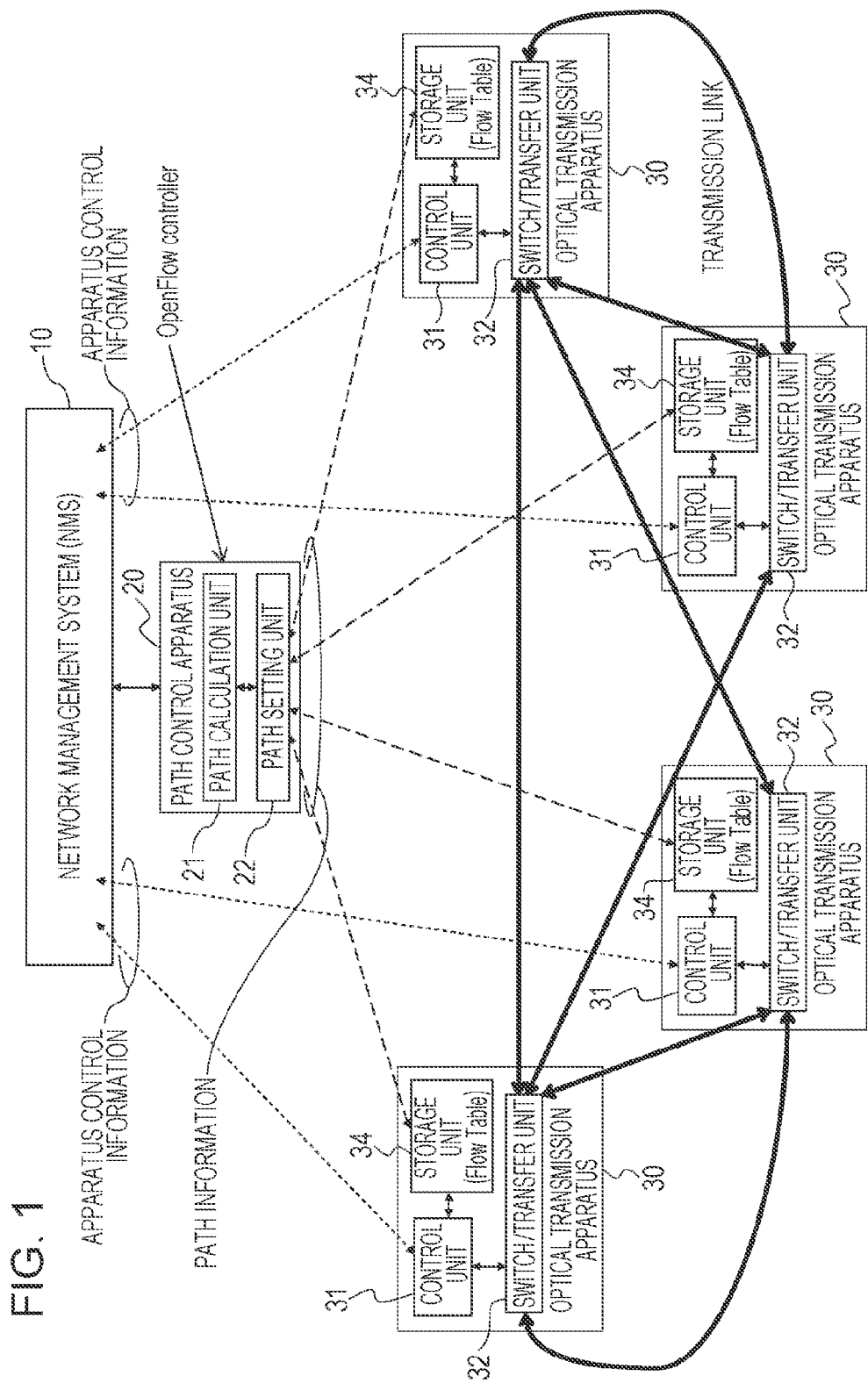
FIG. 1 is a diagram illustrating an example of a network in which OpenFlow technology is applied to management of a circuit-switched communication system or an optical communication system, according to an embodiment.

FIG. 1 is a diagram illustrating an example of a network in which the OpenFlow technology is applied to management of a circuit-switched communication system or an optical communication system. Examples of circuit-switched communication systems include SONET (Synchronous Optical Network), SDH (Synchronous Digital Hierarchy), and OTN (Optical Transport Network). WDM (Wavelength Division Multiplexing) is an example of an optical communication system.

A description of the OpenFlow technology may be found, for example, in N. McKeown, T. Anderson, H. Balakrishnan, G. Parulkar, L. Peterson, J. Rexford, S. Shenker, and J. Turner. OpenFlow: enabling innovation in campusnetworks, ACM SIGCOMM Computer Communication Review, 38(2): 69-74, Apr. 2008. Expanding of the path control technique in the packet communication based on the OpenFlow technology to the circuit-switched communication system or the optical communication system such as SONET, SDH, OTN, WDM, and the like is discussed in Saurav Das, Guru Parulkar, Nick McKeown, Unifying Packet and Circuit Switched Networks, Below IP Networking workshop in conjunction with Globecom'09, Hawaii, Nov. 2009.

The network illustrated in FIG. 1 includes, by way of example, a network management system (NMS) 10, a path control apparatus 20, and an optical transmission apparatus (hereinafter, also referred to simply as an optical node or more simply as a node) 30.

The NMS 10 centrally manages the whole network.

The path control apparatus 20 controls a path of a signal transmitted over the network. The NMS 10 and the path control apparatus 20 are examples of higher-level apparatuses node 30.

The node 30 performs switching of the destination of a signal and transferring of the signal according to an instruction from the path control apparatus 20.

The path control apparatus 20 includes, by way of example, a path calculation unit 21 that calculates a signal path, and a path setting unit 22 that controls the node 30 such that the calculated path is achieved.

The node 30 includes, by way of example, a switch/transfer unit 32, a storage unit 34, and a control unit 31.

The switch/transfer unit 32 performs switching of the destination of the signal and transferring of the signal.

The storage unit 34 stores information for use by the path control apparatus 20 in controlling the path. The information includes a flow table and the like.

The control unit 31 performs controlling of the apparatus, monitoring of the apparatus, and the like according to the control information given from the NMS 10.

Note that in the present example, the node 30 is an apparatus supporting one or more communication methods including SONET, SDH, OTN, WDM, and the like.

Figure 2:
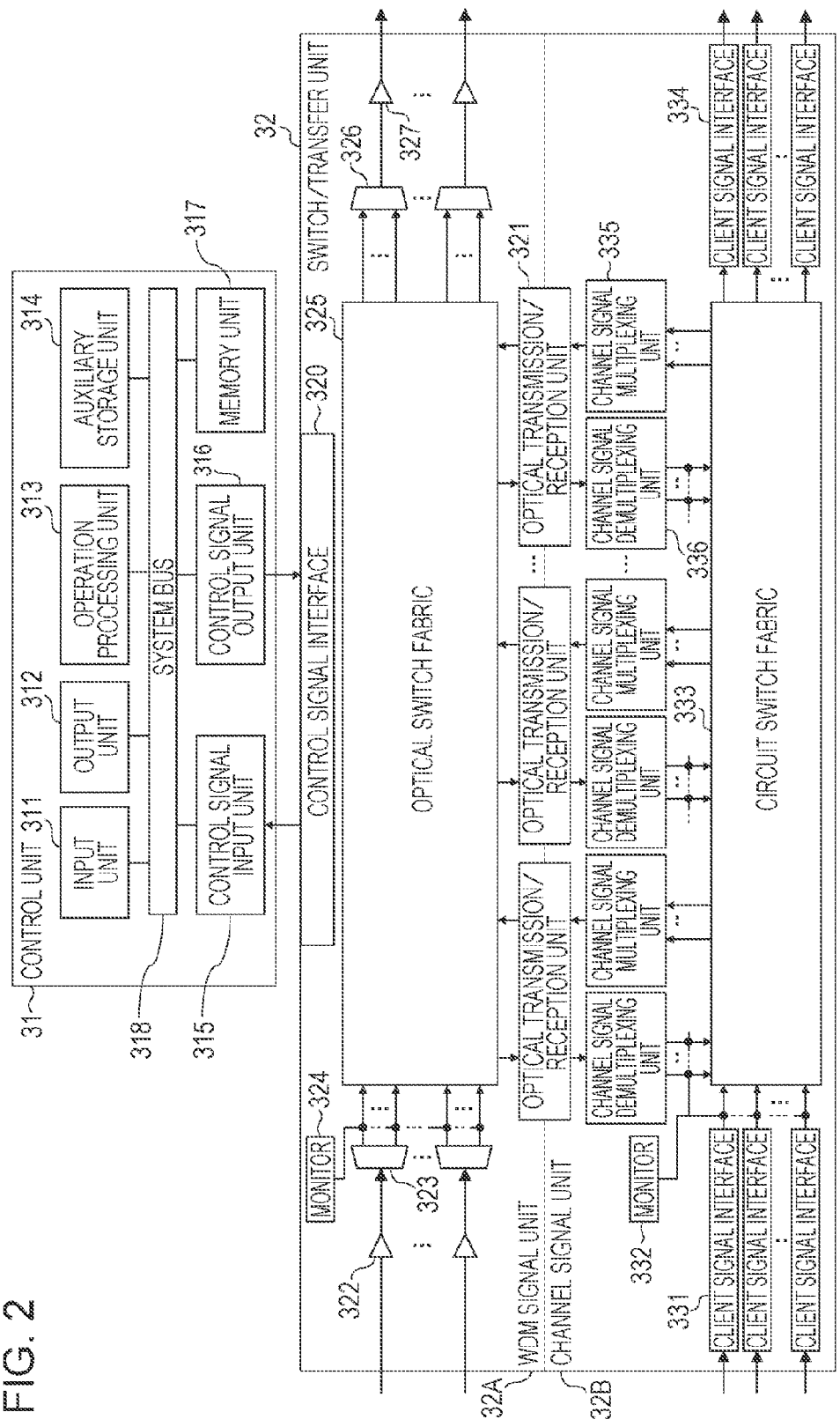
FIG. 2 is a diagram illustrating an example of a hardware configuration of an optical transmission apparatus illustrated by way of example in FIG. 1, according to an embodiment.

FIG. 2 is a diagram illustrating an example of a hardware configuration of the node 30. The node 30 illustrated in FIG. 2 includes a control unit 31 including, by way of example, an input unit 311, an output unit 312, an operation processing unit 313, an auxiliary storage unit 314, a control signal input unit 315, a control signal output unit 316, a memory unit 317, and a system bus 318.

The input unit 311, the output unit 312, the auxiliary storage unit 314, the control signal input unit 315, the control signal output unit 316, and the memory unit 317 are capable of communicating with each other via the system bus 318 under the control of the operation processing unit 313. Note that the memory unit 317 and/or the auxiliary storage unit 314 correspond to the storage unit 34 described above.

The input unit 311 receives, for example, a control signal such as an instruction, a command, and the like from a higher-level apparatus (for example, the NMS 10).

The output unit 312 transmits a control signal, such as an instruction and a command, to the NMS 10.

The operation processing unit 313 integrally controls an operation of the control unit 31. The operation processing unit 313 may be realized using a CPU, a DSP, or the like.

The memory unit 317 stores information used in an operation (operational processing by the operation processing unit 313) of the control unit 31. This information includes a flow table or the like that is an example of setting information associated with the switch/transfer unit 32.

The auxiliary storage unit 314 provides an auxiliary storage area to the memory unit 317.

The control signal input unit 315 receives a control signal from the switch/transfer unit 32 (a control signal interface 320 described later).

The control signal output unit 316 transmits a control signal including the above-described setting information or the like to the switch/transfer unit 32 (the control signal interface 320).

The node 30 includes, as an example of the switch/transfer unit 32, a WDM signal unit 32A and a circuit-switching signal unit 32B. Note that the node 30 does not necessarily include both the WDM signal unit 32A and the circuit-switching signal unit 32B, and the node 30 may include only one of them as needed basis.

The WDM signal unit 32A and the circuit-switching signal unit 32B are capable of transmitting and receiving a signal to and from each other via the optical transmission/reception unit 321. For example, an optical signal passing through the optical switch fabric unit 325 of the WDM signal unit 32A may be converted into an electric signal by the optical transmission/reception unit 321 and input to the circuit switch fabric unit 333 of the circuit-switching signal unit 32B. On the other hand, a signal passing through the circuit switch fabric unit 333 of the circuit-switching signal unit 32B may be converted into an optical signal and input to the optical switch fabric unit 325 of the WDM signal unit 32A.

The WDM signal unit 32A of the switch/transfer unit 32 incudes, by way of example, an optical signal amplifier unit 322, an optical wavelength demultiplexing unit 323, a monitor 324, an optical switch fabric unit 325, an optical wavelength multiplexing unit 326 and an optical signal amplifier unit 327.

The optical signal amplifier unit 322 amplifies input WDM light to a predetermined optical power level.

The optical wavelength demultiplexing unit 323 demultiplexes the input WDM light into respective wavelengths (channels).

The monitor 324 monitors light with each wavelength demultiplexed by the optical wavelength demultiplexing unit 323, and acquires information (a monitoring result) including an input wavelength, an input port number of the optical switch fabric unit 325, and the like. The number of input ports corresponds, by way of example, to the number of pieces of WDM light input to the optical wavelength demultiplexing unit 323 (see, for example, FIG. 3). The monitoring result is given to the operation processing unit 313 of the control unit 31 via the control signal interface 320.

The optical switch fabric unit 325 switches an outgoing path (destination) of each optical signal with a particular wavelength. That is, the optical switch fabric unit 325 performs switching such that each of the input light with respective wavelengths demultiplexed by the optical wavelength demultiplexing unit 323 is transferred to one of output ports. The number of output ports corresponds, by way of example, to the number of outputs of the optical wavelength multiplexing unit 326 (see, for example, FIG. 3).

The optical wavelength multiplexing unit 326 wavelength-multiplexes the outputs of the optical switch fabric unit 325 into groups each including a plurality of wavelengths and outputs resultant WDM light.

The optical signal amplifier unit 327 amplifies the output (WDM light) from the optical wavelength multiplexing unit 326 to a predetermined optical power level.

On the other hand, the circuit-switching signal unit 32B of the switch/transfer unit 32 includes, by way of example, a client signal interface 331, a monitor 332, a circuit switch fabric unit 333, a client signal interface 334, a circuit-switched signal multiplexing unit 335, and a circuit-switched signal demultiplexing unit 336.

The client signal interface 331 converts a client signal, such as an Ethernet (registered trademark) signal or IP (Internet Protocol) signal, into a signal (circuit-switched signal) in a predetermined format specified in the circuit-switched communication system, such as SONET, SDH, or OTN, and the client signal interface 331 outputs the resultant circuit-switched channel signal to the circuit switch fabric unit 333. The circuit-switched communication channel (channel) in the circuit-switched communication system corresponds, by way of example, to a time slot (TS) corresponding to a time-division multiplexing (TDM) channel assigned to a path.

The monitor 332 monitors information associated with a path of the circuit-switched communication system and the time slot (TS) corresponding to the time-division multiplexing channel assigned to the path. The monitoring result is given to the operation processing unit 313 of the control unit 31 via the control signal interface 320.

The circuit switch fabric unit 333 performs switching such that the input signal from the client signal interface 331 is transferred to one of the output ports for each channel and the signal is output from the one of the output ports.

The client signal interface 334 converts the output signal from the circuit switch fabric unit 333 into a predetermined signal format and outputs the resultant signal to the side of the client.

The circuit-switched signal multiplexing unit 335 multiplexes a plurality of signals passing through the circuit switch fabric unit 333 and outputs the resultant multiplexed signal to the optical transmission/reception unit 321.

The circuit-switched signal demultiplexing unit 336 demultiplexes the signal input from the optical transmission/reception unit 321 into signals in units of circuit-switched communication channels and outputs the resultant demultiplexed signals to the circuit switch fabric unit 333.

The optical transmission/reception unit 321 converts the electric circuit-switched channel signal input from the circuit-switched signal multiplexing unit 335 into an optical signal, and the optical transmission/reception unit 321 converts the optical signal input from the optical switch fabric unit 325 into an electric circuit-switched channel signal.

The control signal interface 320 interfaces with the control signal input unit 315 and the control signal output unit 316 of the control unit 31 such that a control signal is transmitted and received to or from the control unit 31. The control signal includes setting information or the like associated with one or both of optical switch fabric unit 325 and the circuit switch fabric unit 333.

Figure 3:
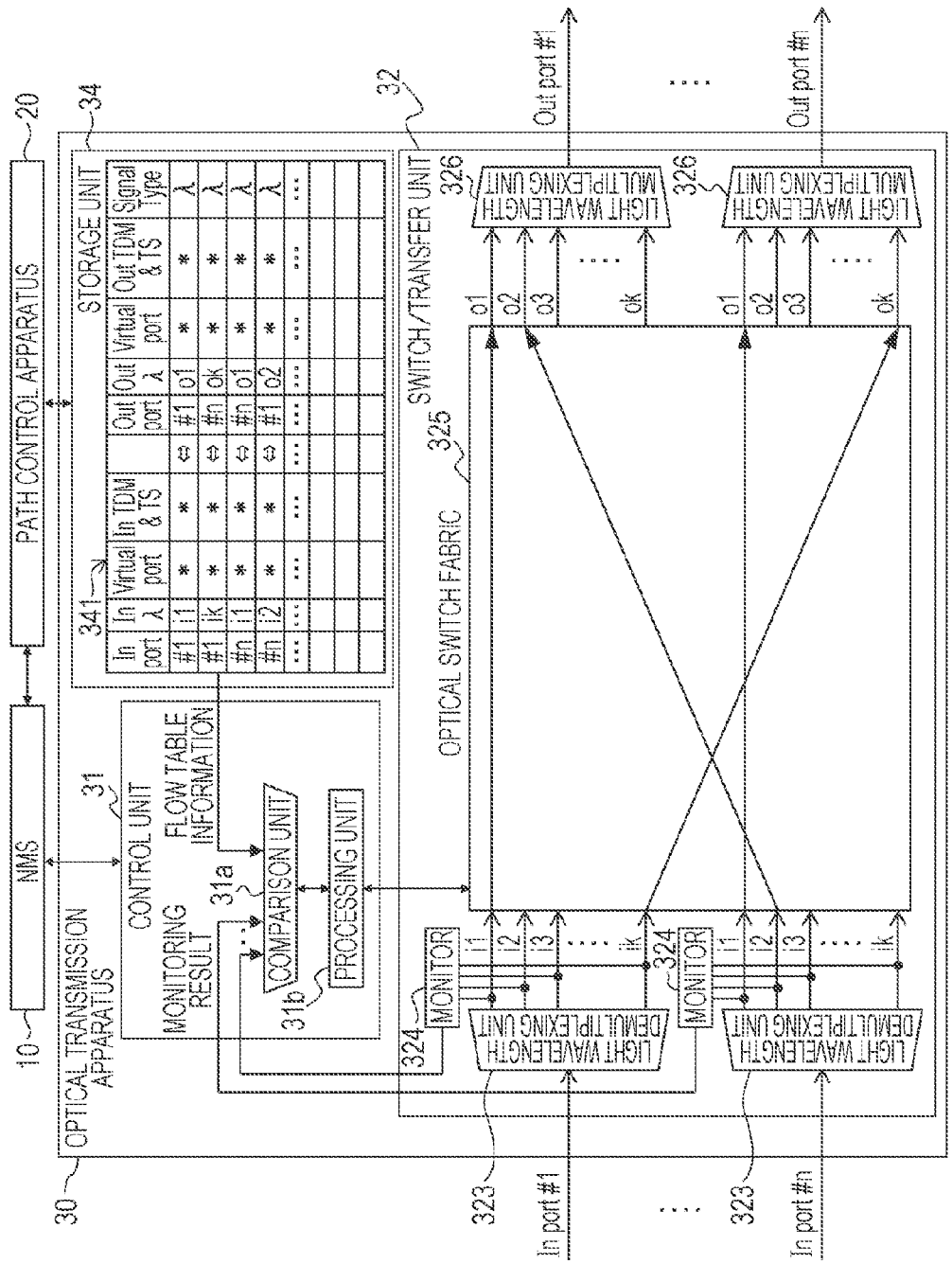
FIG. 3 is a block diagram illustrating an example of a functional configuration of an optical transmission apparatus illustrated by way of example in FIG. 1, according to an embodiment.

FIG. 3 is a block diagram illustrating an example of a functional configuration of the node 30. The node 30 illustrated in FIG. 3 is, by way of example but not by way of limitation, a WDM node.

The switch/transfer unit 32 includes, by way of example, n input ports (In port #1, ..., In port #n illustrated in FIG. 3) and n output ports (Out port #1, ..., Out-port #n illustrated in FIG. 3).

The control unit 31 is functionally configured to include a comparison unit 31a and a processing unit 31b. The comparison unit 31a and the processing unit 31b are examples of functions that are realized by causing the operation processing unit 313 to read information from the memory unit 317 or the auxiliary storage unit 314 and to perform an operation based on the read information.

The comparison unit 31a compares the monitoring result given by the monitor 324 of the switch/transfer unit 32 with information stored in the storage unit 34.

The processing unit 31b controls the optical switch fabric unit 325 according to the result of the comparison performed by the comparison unit 31a.

The storage unit 34 stores a flow table 341. The flow table 341 includes, by way of example, input port information (In port), optical signal wavelength information (In λ) on an input side, virtual port information (Virtual port) on the input side, time slot information (In TDM & TS) on the input side, output port information (Out port), optical signal wavelength information (Out λ) on an output side, virtual port information (Virtual port) on the output side, time slot information (Out TDM & TS) on the output side, and signal type information (Signal Type).

Descriptions about information elements described above may be found, for example, in the following literature: Saurav Das, et. al., "Packet and Circuit Network Convergence with OpenFlow", OTuG 1, OFC/NFOEC 2010; and Saurav Das, et. al., "Experimental demonstration of OpenFlow control of packet and circuit switches", OTuG 2, OFC/NFOEC 2010.

Note that In TDM & TS and Out TDM & TS are information indicating paths of a circuit-switched communication system (SONET, SDH, OTN or the like) and time slots (TS) corresponding to time-division multiplexing channels assigned to the paths.

The information described in the flow table 341 indicates an input-output relationship of signals such that a signal identified by a signal type (Signal Type) is input via an input port with an attribute {In port, In $\lambda$, Virtual port, In TDM & TS}, and output via an output port with an attribute {Out port, Out $\lambda$, Virtual port, Out TDM & TS}.

In the flow table 341 illustrated in FIG. 3, "*" indicates a wild card that is allowed to take an arbitrary value. In the present example, signals are assumed to be WDM signals, and thus a wild card "*" is set in each attribute of {Virtual port, In TDM & TS, Virtual port, Out TDM & TS} other than {In Port, In $\lambda$, Out port, Out $\lambda$, Signal Type}.

A WDM signal input via an input port (In port #i (i=1 ... n)) is demultiplexed by the optical wavelength demultiplexing unit 323 connected to each port into optical signals with wavelengths in wavelength paths.

Each of the optical signals with the respective wavelengths is partially branched and input to the monitor 324 to monitor the attribute of the input signal. In the present example in which WDM signals are assumed, two attributes {In port, In $\lambda$} of {In port, In $\lambda$, Virtual port, In TDM & TS} are monitored. Thereafter, the optical signals with the respective wavelengths are input to the optical switch fabric unit 325.

The comparison unit 31a of the control unit 31 retrieves an entry in which information {In port, In $\lambda$} in the flow table 341 stored in the storage unit 34 is identical to information {In port, In $\lambda$} obtained as a monitoring result by the monitor 324.

According to the information {In port, In $\lambda$} and {Out port, Out $\lambda$} of this entry, setting is performed in terms of connections between input ports and output ports of the optical switch fabric unit 325. In the example in FIG. 3, connections are illustrated by way of example for four optical paths. Thus, in other words, the flow table 341 is an example of connection setting information associated with the optical switch fabric unit 325.

The optical signals with the respective wavelengths output from the optical switch fabric unit 325 are wavelength-multiplexed by the optical wavelength multiplexing unit 326 and output as WDM signals from output ports (Out port #i).

The connection setting information associated with the four optical path descried above may be stored, for example, according to one of two methods described below.

First Method: On-Demand Setting in Response to an Optical Path Connection Request A route for each optical path is designed by the NMS 10 or the path control apparatus 20 according to an optical path setting/connecting request from the NMS 10. The connection setting information associated with the optical switch fabric unit 325 in terms of the optical path is stored in the storage unit 34 of each optical transmission apparatus 30 via the path setting unit 22 of the path control apparatus 20 (see FIG. 1). On the other hand, according to an optical path connection cancelling request from the NMS 10, the connection setting information of the optical switch fabric unit 325 in terms of an optical path is deleted from the storage unit 34 of each optical transmission apparatus 30 via the path setting unit 22 of the path control apparatus 20.

Second Method: Presetting Taking into Account Prediction of Optical Path

In the NMS 10 or the path control apparatus 20, a route is designed for at least one or more paths predicted to be set. The connection setting information of the optical switch fabric unit 325 in terms of the optical paths is stored in the storage unit 34 of each optical transmission apparatus 30 via the path setting unit 22 of the path control apparatus 20. On the other hand, in a case where a request to delete an optical path based on prediction is issued from the NMS 10, the connection setting information of the optical switch fabric unit 325 in terms of the optical path is deleted from the storage unit 34 of each optical transmission apparatus 30 via the path setting unit 22 of the path control apparatus 20.

In the case of the first method, when an optical path connection request is issued, the route design for an optical path is performed and connection setting information associated with the optical switch fabric unit 325 is stored in the storage unit 34 of the optical transmission apparatus 30, and thus it is possible to make setting for a new optical path taking into account a current connection state of existing optical paths, which makes it possible to perform the design such that no blocking of optical paths occurs.

On the other hand, in the case of the second method, optical paths are designed based on a prediction, and the connection setting information associated with the optical switch fabric unit 325 is stored in advance in the storage unit 34 of each optical transmission apparatus 30. For example, in a case where an optical path is designed in advance based on a prediction of service in which the optical path is lent for a specific period of time and connection setting information associated with the optical switch fabric unit 325 is set in advance, there is a possibility that the connection setting information set in advance may specify the optical switch fabric unit 325 to be set such that a plurality of different input ports of the optical switch fabric unit 325 are connected to the same output port. In such a situation, if an optical path corresponding to the connection setting information is actually input by mistake to the optical transmission apparatus 30, optical path blocking occurs.

Figure 4:
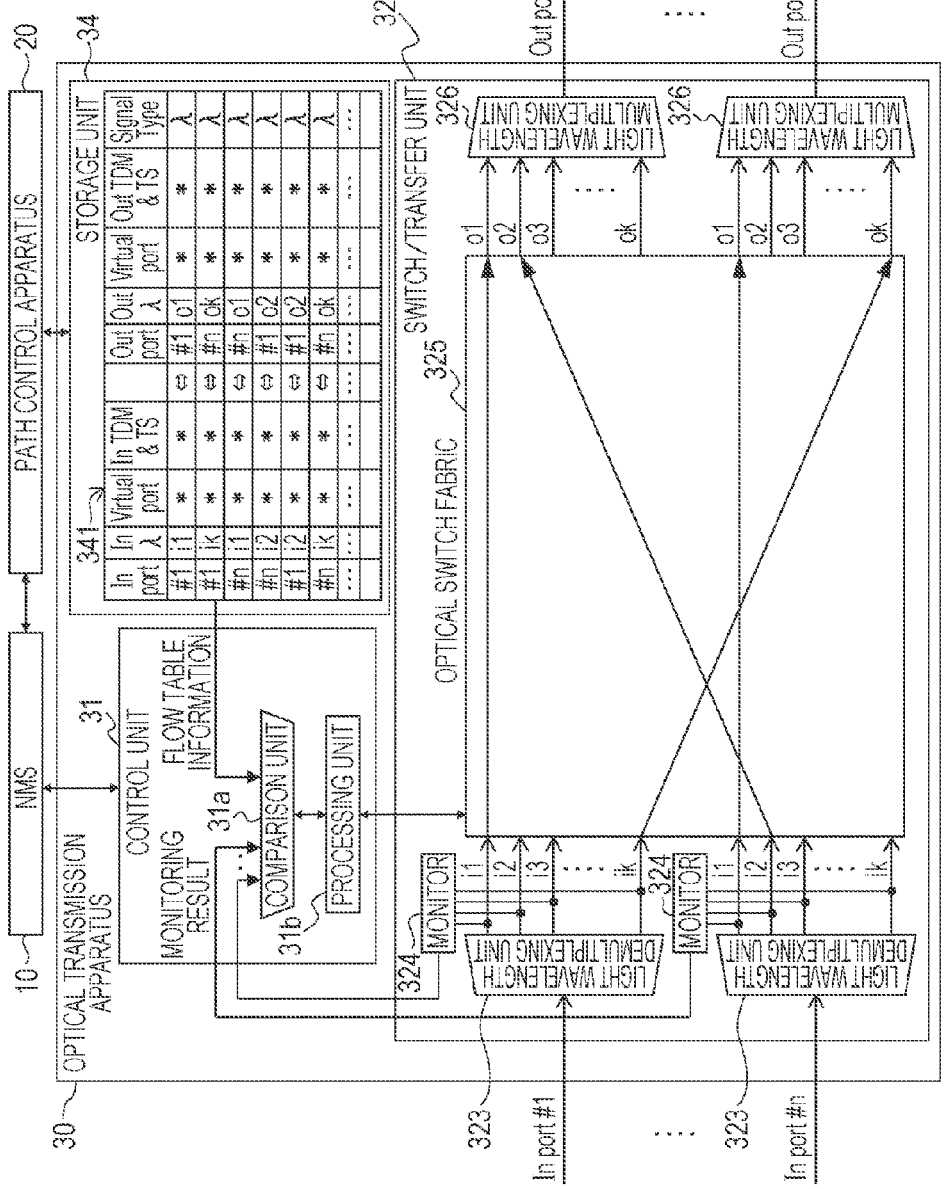
FIG. 4 is a block diagram illustrating an example of a functional configuration of an optical transmission apparatus illustrated by way of example in FIG. 1, according to an embodiment.

A specific example of the above situation is described below with reference to FIG. 3 and FIG. 4. In FIG. 4, connection setting information associated with the optical switch fabric unit 325 includes two optical paths in addition to those illustrated in FIG. 3.

This connection setting information specifies the connection of the optical switch fabric unit such that two different inputs {In port, In $\lambda$}={#1, ik} and {In port, In $\lambda$}={#n, ik} are connected to one output {Out port, Out $\lambda$}={#n, ok}, and two different inputs {In port, In $\lambda$}={#1, i2} and {In port, In $\lambda$}={#n, i2} are connected to one output {Out port, Out $\lambda$}={#1, o2}.

In FIG. 3 and FIG. 4, the input {In port, In $\lambda$}={#1, ik} is connected to the output {Out port, Out $\lambda$}={#n, ok}, and the input {In port, In $\lambda$}={#n, i2} is connected to the output {Out port, Out $\lambda$}={#1, o2}.

Figure 5:
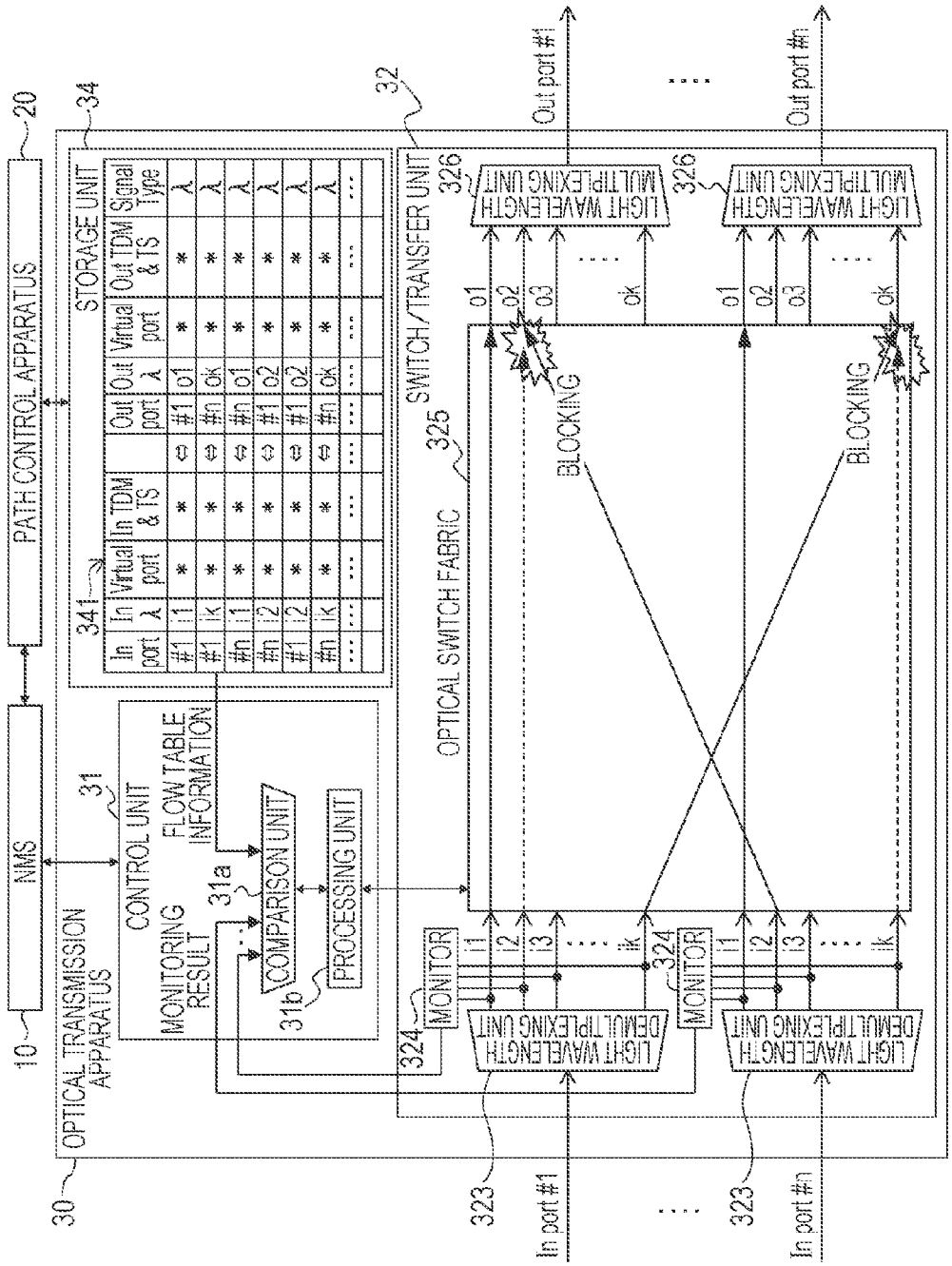
FIG. 5 is a block diagram illustrating an example of a functional configuration of an optical transmission apparatus illustrated by way of example in FIG. 1, according to an embodiment.

In the state described above, if optical signals corresponding to new two wavelength paths are input, then the state becomes as illustrated in FIG. 5. That is, new optical signals are input at {In port, In $\lambda$}={#1, i2} and {In port, In $\lambda$}={#1, ik}.

In this situation, when output ports corresponding to the respective new inputs are retrieved by comparing the monitoring result of the input signals with the information stored in the storage unit 34 of the optical transmission apparatus 30, the output {Out port, Out λ}={#1, o2} is retrieved as the output port for the input {In port, In λ}={#1, i2}. However this output port is already assigned for the optical signal from the input {In port, In λ}={#n, i2}. On the other hand, the output {Out port, Out λ}={#n, ok} is retrieved as the output port for the input {In port, In λ}={#n, ik}, but this output port is already assigned for the optical signal from the input {In port, In λ}={#1, ik}. This causes an occurrence of a blocking state in which optical signals collide.

An occurrence of such blocking causes a communication failure (a telephone call loss). In view of the above, the embodiment provides a technique for minimizing the possibility of an occurrence of such a communication failure.

Figure 6:
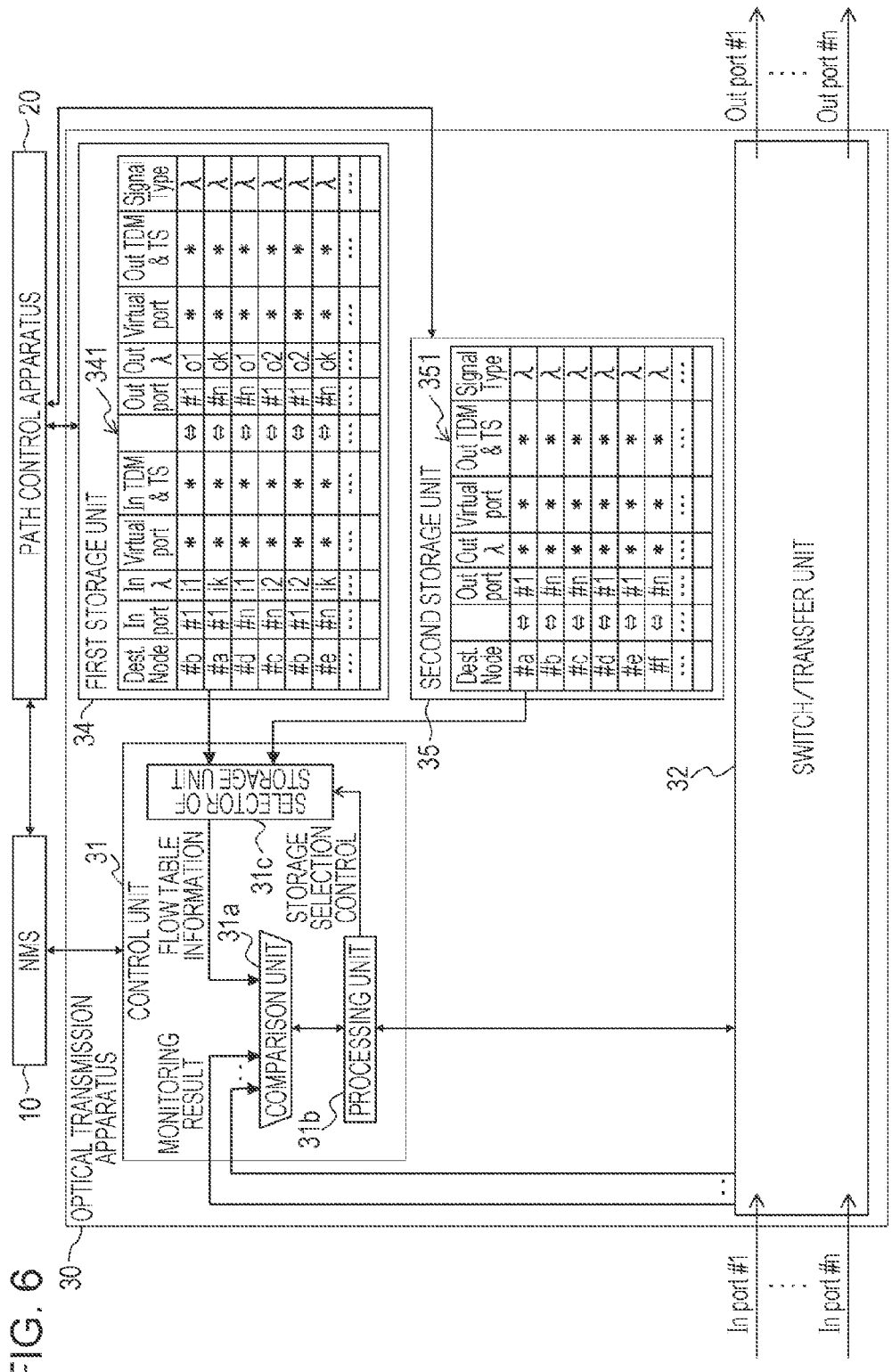
FIG. 6 is a block diagram illustrating an example of a configuration of an optical transmission apparatus, according to an embodiment.

FIG. 6 is a block diagram illustrating an example of a configuration of the optical node 30 according to the embodiment. The optical node 30 illustrated by way of example in FIG. 6 is by way of example a WDM node. The optical node 30 illustrated by way of example in FIG. 6 is different in configuration from the example illustrated in FIG. 3 to FIG. 5 in that a second storage unit 35 is provided in addition to the storage unit 34 serving as a first storage unit, and in that the control unit 31 additionally includes a selector 31c.

The first storage unit 34 stores information given from the path control apparatus 20, and the second storage unit 35 stores, as with the first storage unit 34, information from the path control apparatus 20, but the information stored in the second storage unit 35 is different from the information stored in the first storage unit 34.

More specifically, the first storage unit 34 stores, by way of example, a first flow table 341, and the second storage unit 35 stores, by way of example, a second flow table 351. The first storage unit 34 may be a first storage area of a memory, and the second storage unit 35 may be a second storage area of the memory. In other words, the flow tables 341 and 351 may be stored in different storage areas of the same memory.

The first flow table 341 includes path destination node information (Dest. Node) in addition to input port information {In port}, optical signal wavelength information (In λ) on the input side, virtual port information (Virtual port) on the input side, time slot information (In TDM & TS) on the input side, output port information (Out port), optical signal wavelength information (Out λ) on the output side, virtual port information (Virtual port) on the output side, time slot information (Out TDM & TS) on the output side, and signal type information (Signal Type).

In the second flow table 351, connection setting information associated with the optical switch fabric unit 325 is described. In this connection setting information, output ports are specified for path destination nodes (Destination node). More specifically, the second flow table 351 includes, by way of example, path destination node information (Dest. Node), output port information (Out port), optical signal wavelength information (Out λ) on the output side, virtual port information (Virtual port) on the output side, time slot information (Out TDM & TS) on the output side, and signal type information (Signal Type).

In other words, the first and second flow tables 341 and 351 are linked via the path destination node information (Destination node). By providing an entry for each destination node, it becomes possible to reduce the amount of setting information compared with a case in which entries are provided for each path.

In a case where a failure occurs in a path, the selector 31c of the control unit 31 switches the storage unit being referred to from the first storage unit 34 to the second storage unit 35. That is, the control unit 31 sets the optical switch fabric unit 325 according to the flow table 341 stored in the first storage unit 34, but when blocking occurs for a path (an optical path or a circuit-switched channel path), the control unit 31 sets the optical switch fabric unit 325 according to the flow table 351 stored in the second storage unit 35. Like the comparison unit 31a and the processing unit 31b, the selector 31c is an example of a function that is realized by the operation processing unit 313 (see FIG. 2) by reading information from the memory unit 317 or the auxiliary storage unit 314 and performing an operation based on the read information.

Figure 7:
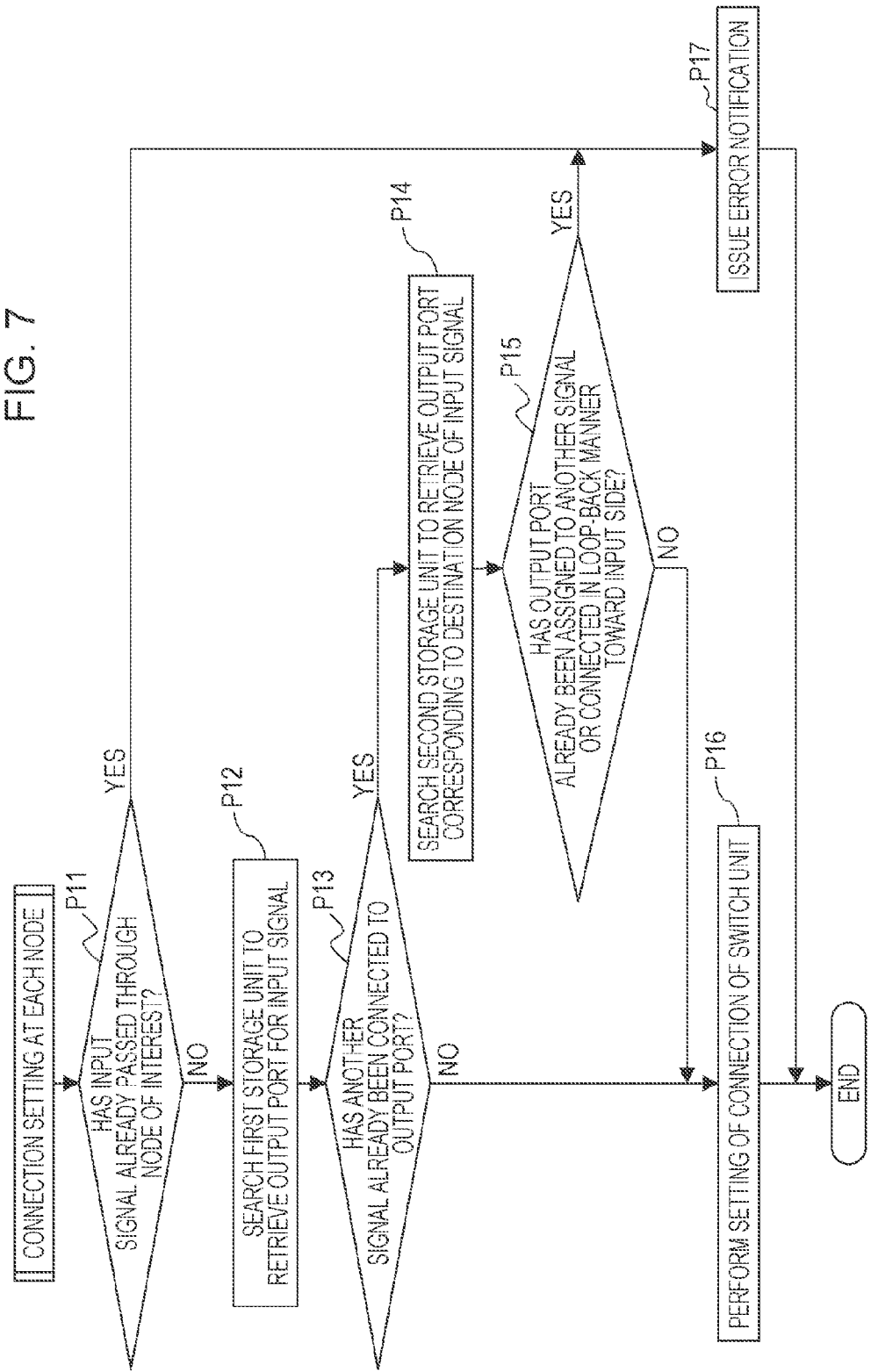
FIG. 7 is a diagram illustrating a first example of an operational flowchart for connection setting of a switch/transfer unit of an optical transmission apparatus illustrated by way of example in FIG. 6, according to an embodiment.

FIG. 7 illustrates a first example of an operational flowchart for connection setting of a switch/transfer unit of an optical transmission apparatus illustrated by way of example in FIG. 6.

In the optical node 30, the control unit 31 monitors an input signal and determines whether this input signal has already passed through the node 30 (operation P11).

In a case where the input signal has already passed through the optical node 30 (YES in operation P11), the control unit 31 issues a failure notification indicating an occurrence of a failure to, for example, the path control apparatus 20 (or the NMS 10) (operation P17).

In a case where the input signal has not yet passed through the optical node 30 (NO in operation P11), the control unit 31 monitors the input signal and checks, using the comparison unit 31a, the storage unit 34 (the flow table 341) to retrieve an output port for the input signal (operation P12).

The control unit 31 then makes a determination based on the flow table 341 as to whether another signal has already been connected to the output port (operation P13).

In a case where no other signal is already connected to the output port (NO in operation P13), the control unit 31 performs connection setting on the switch/transfer unit 32 according to the connection setting information acquired from the first storage unit 34 (the flow table 341) (operation P16).

On the other hand, in a case where another signal has already been connected to the output port (YES in operation P13), in other words in a case where a collision (a conflict) occurs at the path output port, the control unit 31 switches the selector 31c from the first storage unit 34 to the second storage unit 35. Thereafter, the control unit 31 searches the second storage unit 35 (the flow table 351) to retrieve an output port corresponding to destination node information of the input signal (operation P14).

The control unit 31 then determines whether another signal is already connected to the output port specified in the flow table 351 or a loop-back connection toward the input side occurs (operation P15).

The determination indicates that another signal is already connected or a loop-back connection toward the input side occurs (YES in operation P15), the control unit 31 issues a failure notification indicating an occurrence of a failure to, for example, the path control apparatus 20 (or the NMS 10) (operation P17).

On the other hand, in a case where no signal has already been connected and no loop-back connection toward the input side occurs (NO in operation P15), the control unit 31 performs connection setting on the switch/transfer unit 32 according to the connection setting information described in the second storage unit 35 (the flow table 351) (operation P16).

Figure 8:
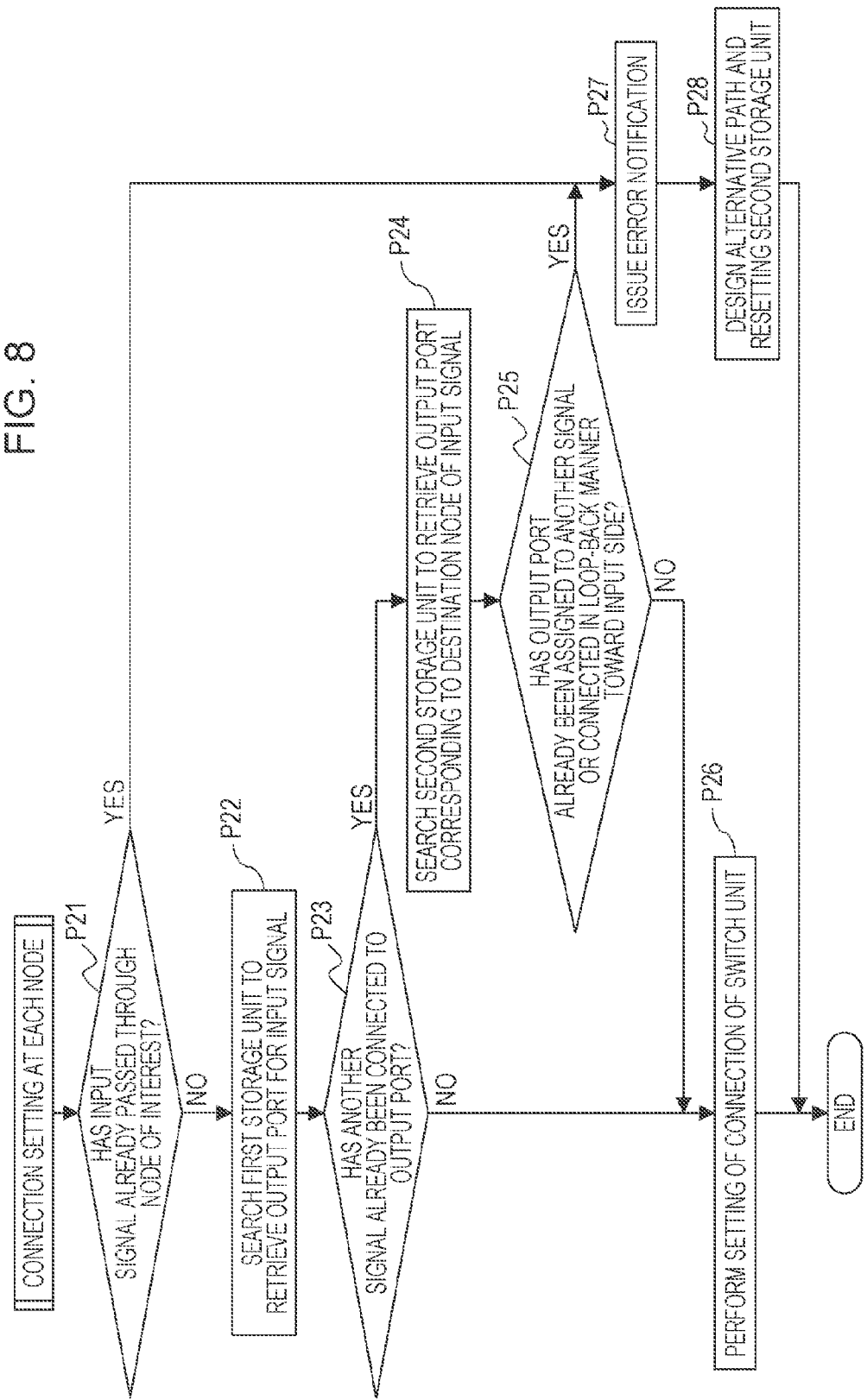
FIG. 8 is a diagram illustrating a second example of an operational flowchart for connection setting of a switch/transfer unit of an optical transmission apparatus illustrated by way of example in FIG. 6, according to an embodiment.

FIG. 8 illustrates a second example of an operational flowchart for connection setting of a switch/transfer unit of an optical transmission apparatus illustrated by way of example in FIG. 6. In FIG. 8, operations P21 to P27 other than operation P28 are similar to operations P11 to P17 described above with reference to FIG. 7.

In operation P28, after the failure notification is issued to the path control apparatus 20 in operation P27, the path control apparatus 20 redesigns a path (alternative path) using the path calculation unit 21 and performs reconfiguration of a path, by using the path setting unit 22, on the control unit 31 of the respective optical node 30. Details thereof will be described later with reference to FIGS. 21 to 24B.

Figure 9:
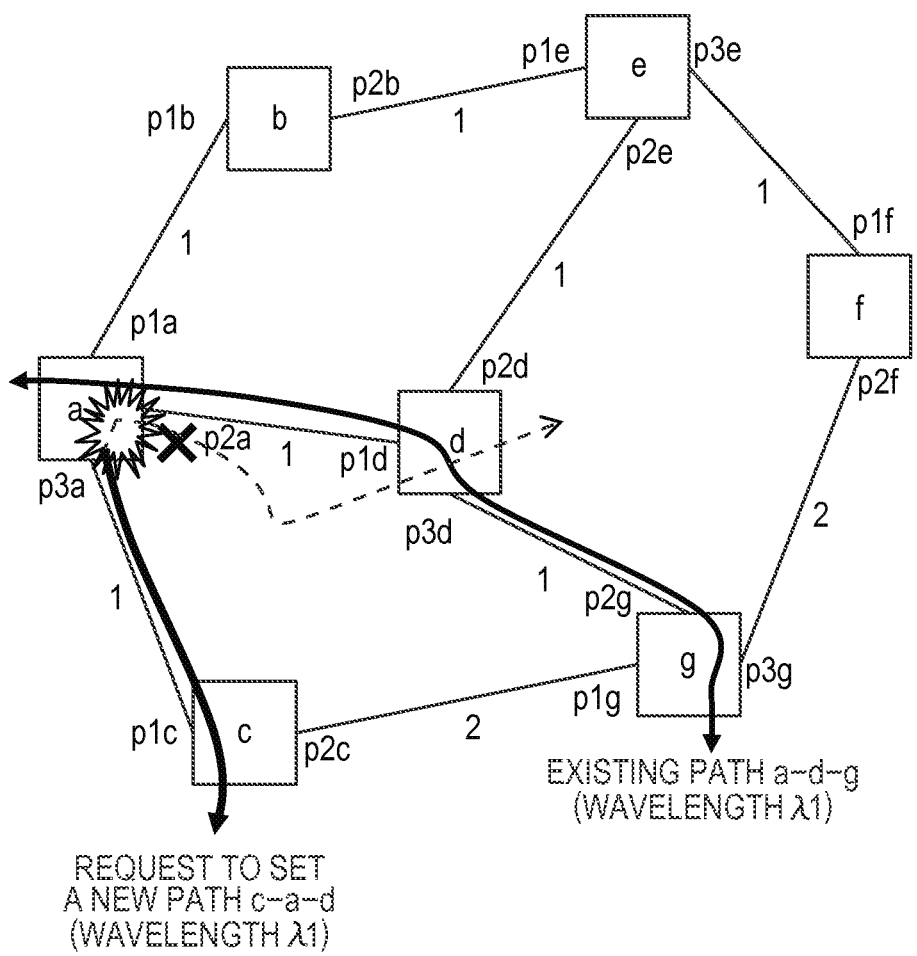
FIG. 9 is a diagram illustrating an example of a network topology, according to an embodiment.

Next, an example of an operation is described below from the viewpoint of a network with reference to FIGS. 9 to 16B. FIG. 9 illustrates an example of a network including seven optical nodes (nodes a, b, c, d, e, f, and g). Symbols p#n at respective input/output parts of the nodes 30 are identification information of the respective input/output parts, where # indicates an integer, and n indicates a node name.

FIG. 10A, FIG. 12A, FIG. 14A, and FIG. 16A each illustrate a manner in which information of an output port (Out Port) corresponding to destination node information (Destination node) stored in the first storage unit 34 is described for each of all nodes stored in the first storage unit 34 of each node 30. Note that information described in a row corresponding to a "Current node" is stored in the first storage unit 34 of each node 30.

For example, in FIG. 9 and FIG. 10A, in the case of the node a, an output port p1a is assigned to destination nodes b, e, and f, an output port p3a is assigned to a destination node c, and an output port p2a is assigned to destination nodes d and g.

FIG. 10B, FIG. 12B, FIG. 14B, and FIG. 16B each illustrate a manner in which information of an output port (Out Port) corresponding to destination node information (Destination node) stored in the second storage unit 35 is described for each of all nodes stored in the second storage unit 35 of each node 30. Note that information described in a row corresponding to a "Current node" is stored in the second storage unit 35 of the corresponding node 30.

For example, in FIG. 9 and FIG. 10B, in the case of the node a, an output port p2a is assigned to destination nodes b, c, e, and f, an output port p1a is assigned to a destination node d, and an output port p3d is assigned to a destination node g.

Here it is assumed by way of example that there is an existing path (a-d-g (wavelength $\lambda 1$)) for transferring a signal using a wavelength $\lambda 1$ from an input node a to a destination node g passing through a node d. In this state, let it be assumed by way of example that a new path (c-a-d (wavelength $\lambda 1$)) is set for transferring a signal using a wavelength $\lambda 1$ from an input node c to a destination node d passing through a node a.

In this case, the new path is set according to the flow table 341 stored in the first storage unit 34 such that an input given at the node c is output from a port p1c of the node c and connected to the node a. Next, at the node a, the flow table 341 stored in the first storage unit 34 specifies the connection for the destination node d such that the path is to be output to a port p2a of the node a such that the path is connected to the node d.

However, the port p2a is already occupied by an existing path and thus the new path is not allowed to use this port p2a (see FIG. 9, FIG. 10A, and FIG. 12A). That is, the new path collides with the existing path in a section a to d.

Figure 11:
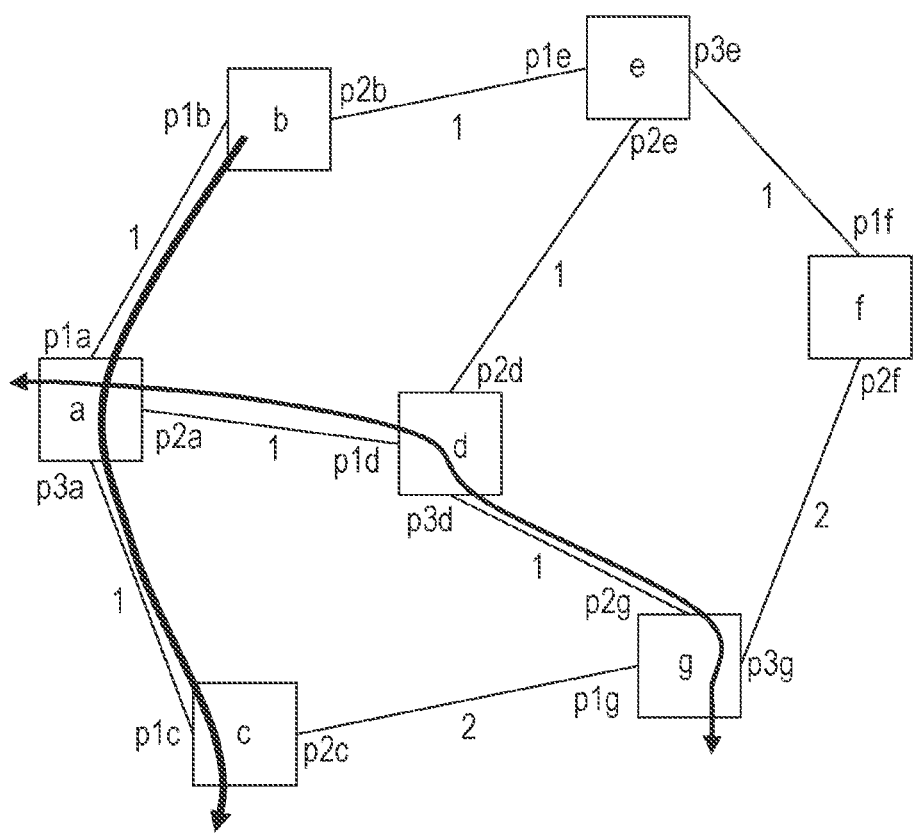
FIG. 11 is a diagram illustrating an example of a network topology, according to an embodiment.
Figure 13:
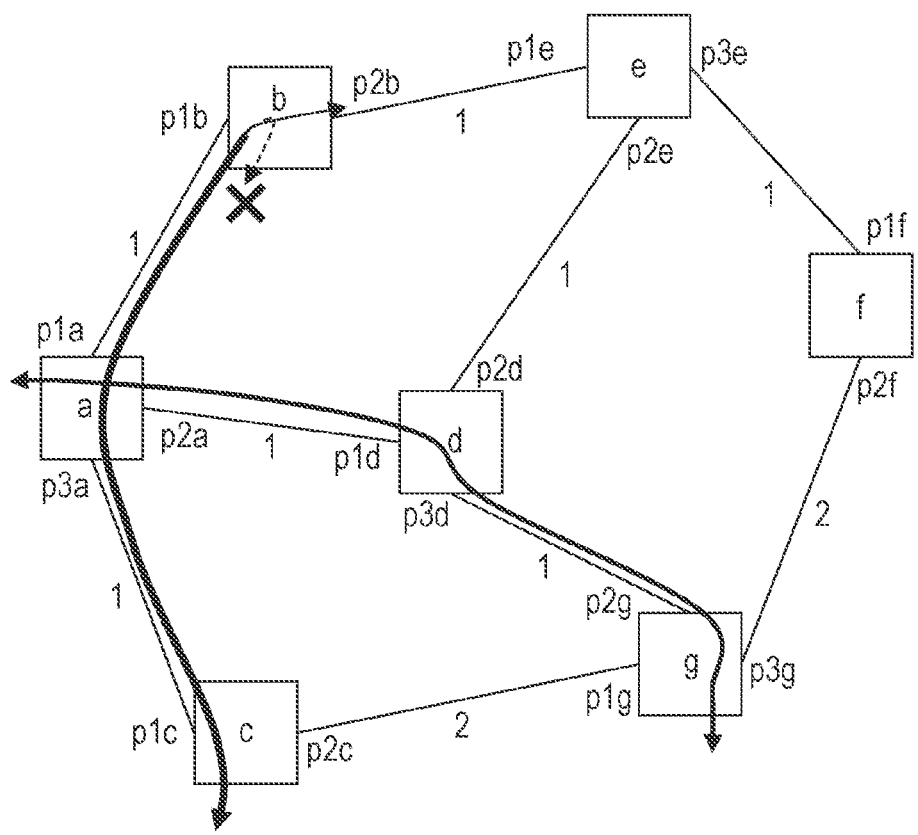
FIG. 13 is a diagram illustrating an example of a network topology, according to an embodiment.

In this situation, as illustrated in FIG. 11 and FIG. 12B, at the node a, the flow table 351 stored in the second storage unit 35 is checked to retrieve a value of an output node for the destination node d. That is, because the destination of the new path is the node d, the flow table 351 in FIG. 12B is checked to retrieve an entry in which Current node=a and Destination node=d.

As a result, a port p1a is retrieved. Thus, at the node a, the switch/transfer unit 32 is set such that the output of the new path with a wavelength $\lambda 1$ is connected to the port p1a of the node a such that the path is connected to the node b.

Thereafter, at the node b, the first storage unit 34 (see FIG. 14A) is checked to retrieve a value of an output node for the destination node d. In a case where there is a corresponding entry (that is, in a case where the first storage unit 34 has an entry in which Current node=b and Destination node=d), setting is performed such that the input signal is output to a port specified by the retrieved value (that is, a port p1b). However, the retrieved port p1b is already used as an output port to the node a, and thus this setting causes the signal to return to the node a (see FIG. 13).

Thus, at the node b, the second storage unit 35 (see FIG. 14B) is checked to retrieve a value of an output port for the destination node d. That is, at the node b, the second storage unit 35 (the flow table 351) is checked whether there is an entry in which Current node=b and Destination node=d. As a result, a port p2b is retrieved. Thus, at the node b, the switch/transfer unit 32 is set such that the signal given at the input port p1b is connected to the output port p2b such that the signal with the wavelength $\lambda 1$ is connected to the node e.

Figure 15:
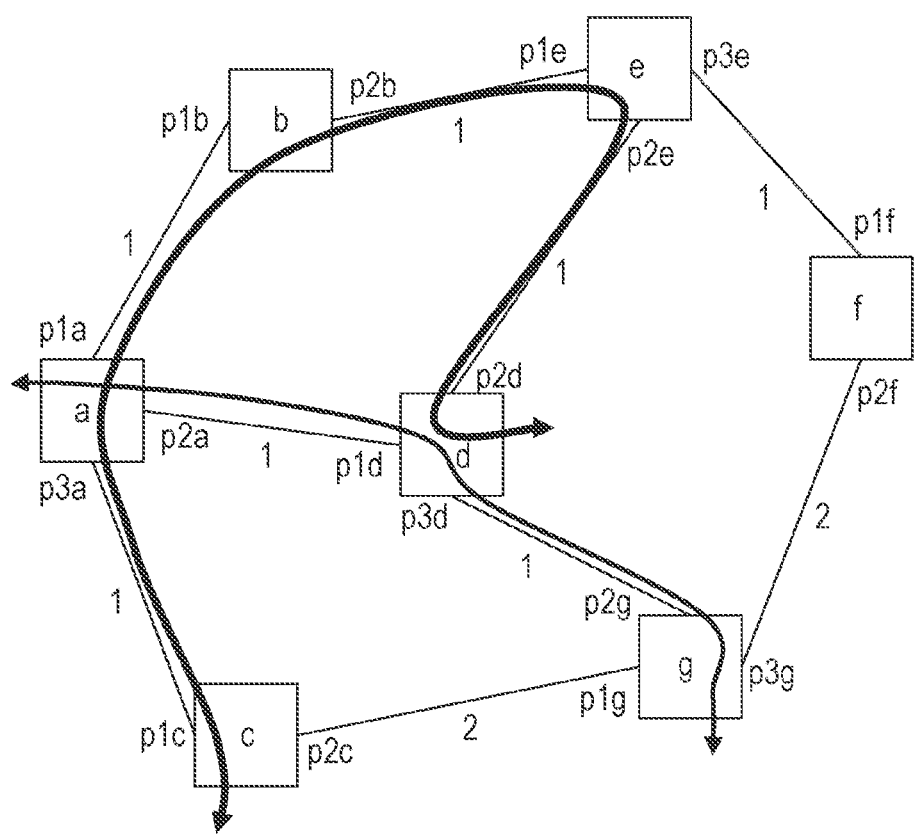
FIG. 15 is a diagram illustrating an example of a network topology, according to an embodiment.

At the node e, as illustrated in FIG. 15 and FIG. 16A, the first storage unit 34 is checked to retrieve a value of an output port for the destination node d. In a case where there is a corresponding entry (that is, in a case where the first storage unit 34 has an entry in which Current node=e and Destination node=d), a port (p2e) is retrieved. Thus, at the node e, connection setting is performed such that the input signal addressed to the destination node d is output to the port p2e of the node e. As a result, the path setting is successfully performed such that the signal with the wavelength $\lambda 1$ is connected to the destination node d.

In the embodiment, as described above, when an input signal given at an arbitrary input port is connected to an output port according to information stored in the storage units 34 and 35, it is possible to minimize the probability of an occurrence of blocking even in a case where the output port is already assigned to another signal. That is, the input signal is allowed to reach the specified destination node 30 without having a communication failure (a telephone call loss).

Furthermore, in the embodiment described above, when path setting is performed, the storage unit used is switched between the first storage unit 34 in which connection setting information is stored in advance and the second storage unit 35 depending on a situation so that blocking does not occur.

Furthermore, because the information stored in the second storage unit 35 includes information for setting an output port corresponding to a destination node (Destination node) of each path, it is possible to reduce the amount of information stored in the second storage unit 35 compared with a case in which an output port is set for each path.

Expansion of Information Stored in Storage Unit 35
Node Disjoint

For a path designed and stored in the first storage unit 34, a path satisfying a node disjoint condition may be designed, and connection setting information for use in setting to realize the path may be stored in the second storage unit 35.

Figure 17:
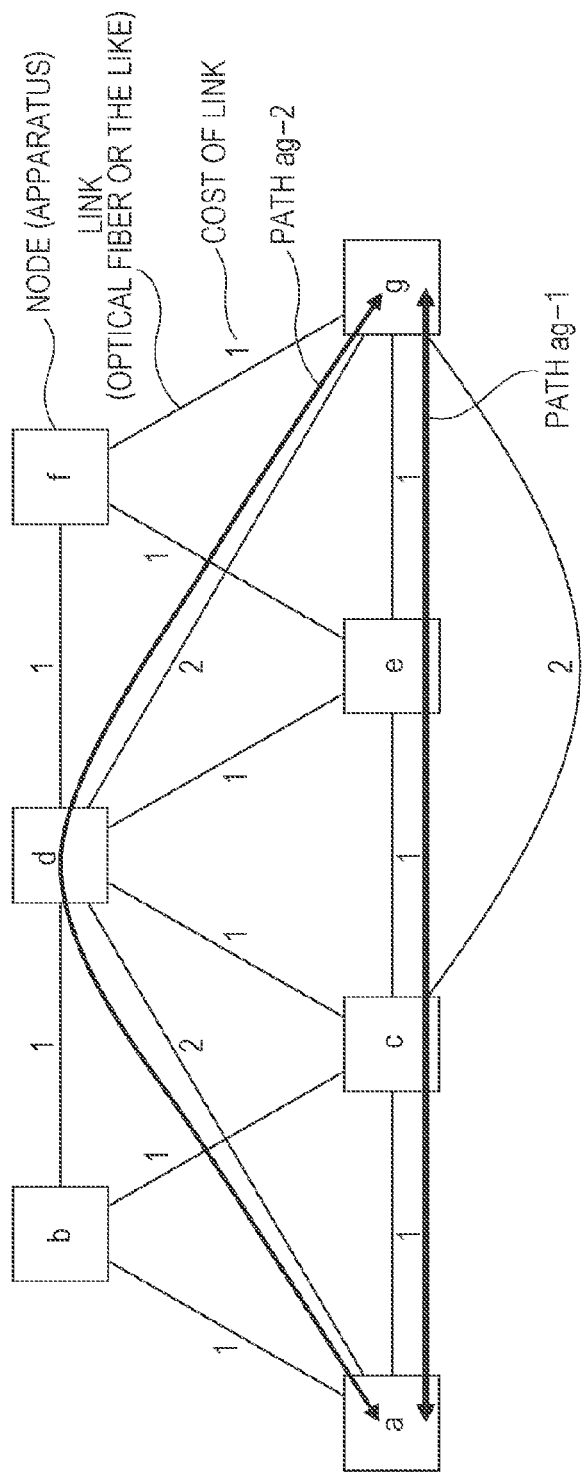
FIG. 17 is a diagram illustrating an example of a network topology for a node-disjoint path.

FIG. 17 illustrates an example of a node disjoint path. In FIG. 17, by way of example, a path between nodes a and g is set such that the node disjoint condition is achieved.

In the node disjoint, paths are set such that two or more different paths between a source and a destination do not share any link and any node. A path ag-1 and a path ag-2 share a source node and a destination node, but they do not share any link and any node in the middle between the source node and the destination node.

The control unit 31 stores setting information associated with the path ag-1 in the first storage unit 34 and setting information associated with the path ag-2 in the second storage unit 35.

Link Disjoint

For a path designed and stored in the first storage unit 34, a path satisfying a link disjoint condition may be designed, and connection setting information for use in setting to realize the path may be stored in the second storage unit 35.

Figure 18:
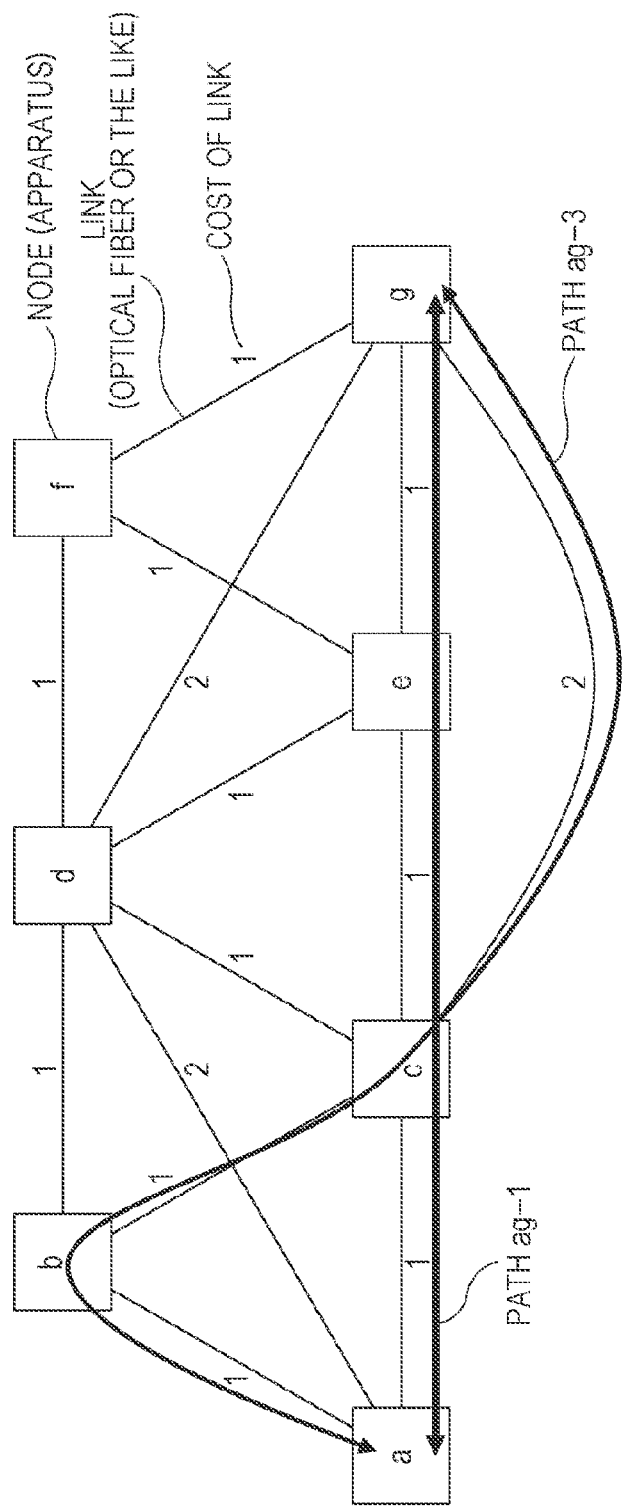
FIG. 18 is a diagram illustrating an example of a network topology for a link disjoint path.

FIG. 18 illustrates an example of a link disjoint path. In FIG. 18, by way of example, a path between nodes a and g is set such that the link disjoint condition is achieved.

In the link disjoint, paths are set such that two or more different paths between a source and a destination do not share any link. Note that the paths are allowed to share a node as long as no link is shared.

For example, in FIG. 18, a path ag-1 and a path ag-3 do not share any link although they share a node c in the middle of the paths.

Setting information associated with the path ag-1 is stored in the first storage unit 34, and setting information associated with the path ag-3 is stored in the second storage unit 35.

Shortest Path

A shortest path from each node 30 to a destination node may be designed and connection setting information for use in setting to realize the path may be stored in the second storage unit 35.

Figure 19:
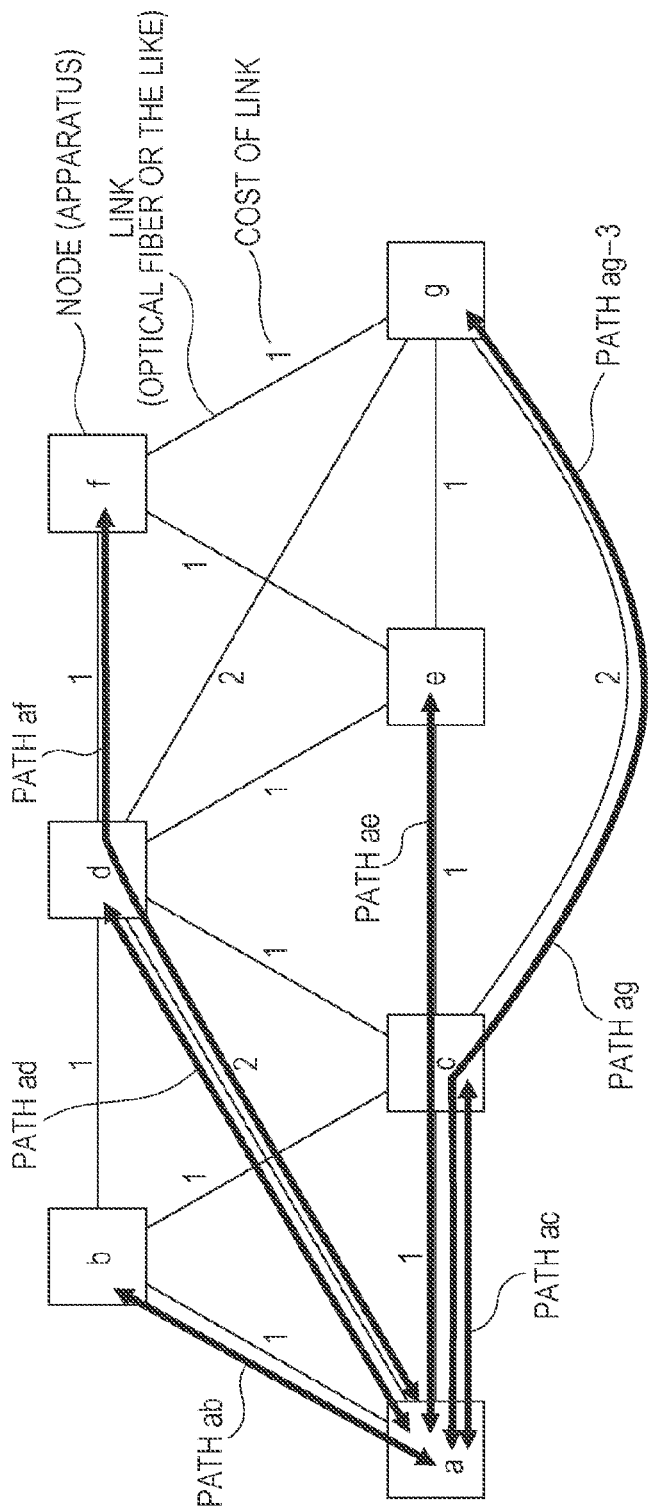
FIG. 19 is a diagram illustrating an example of a network topology for a shortest path from one node to a destination node.

FIG. 19 illustrates an example of a shortest path from a node to a destination node. In FIG. 19, when a node a is taken as an example, a shortest path from the node a to each of all nodes b, c, d, e, f, and g other than the node a is calculated. Here let it be assumed by way of example that a link cost for a link between each two adjacent nodes 30 is given by a value indicated in FIG. 19.

In this case, a shortest path between two nodes 30 is determined by the sum of the link costs and the number of nodes included in the path. In a case where there are two or more paths including the same number of nodes, a path having a smaller value for the sum of link costs is selected as a shortest path. Further, in a case where there are two or more paths having the same sum of link costs, a path including a smaller number of nodes is selected as a shortest path.

In the example illustrated in FIG. 19, a path ab is a shortest path between the node a and the destination node b. A path ac is a shortest path between the node a and the destination node c. A path ad is a shortest path between the node a and the destination node d.

Similarly, a path ae is a shortest path between the node a and the destination node e, a path af is a shortest path between the node a and the destination node f, and a path ag is a shortest path between the node a and the destination node g.

Thus, setting information associated with the paths {ab, ac, ad, ae, af, ag} is stored in the second storage unit 35.

Path with an n-th Shortest Transmission Distance

A path with an n-th shortest transmission distance between a node to a destination node may be designed, and connection setting information for use in setting to realize the path may be stored in the second storage unit 35.

Figure 20:
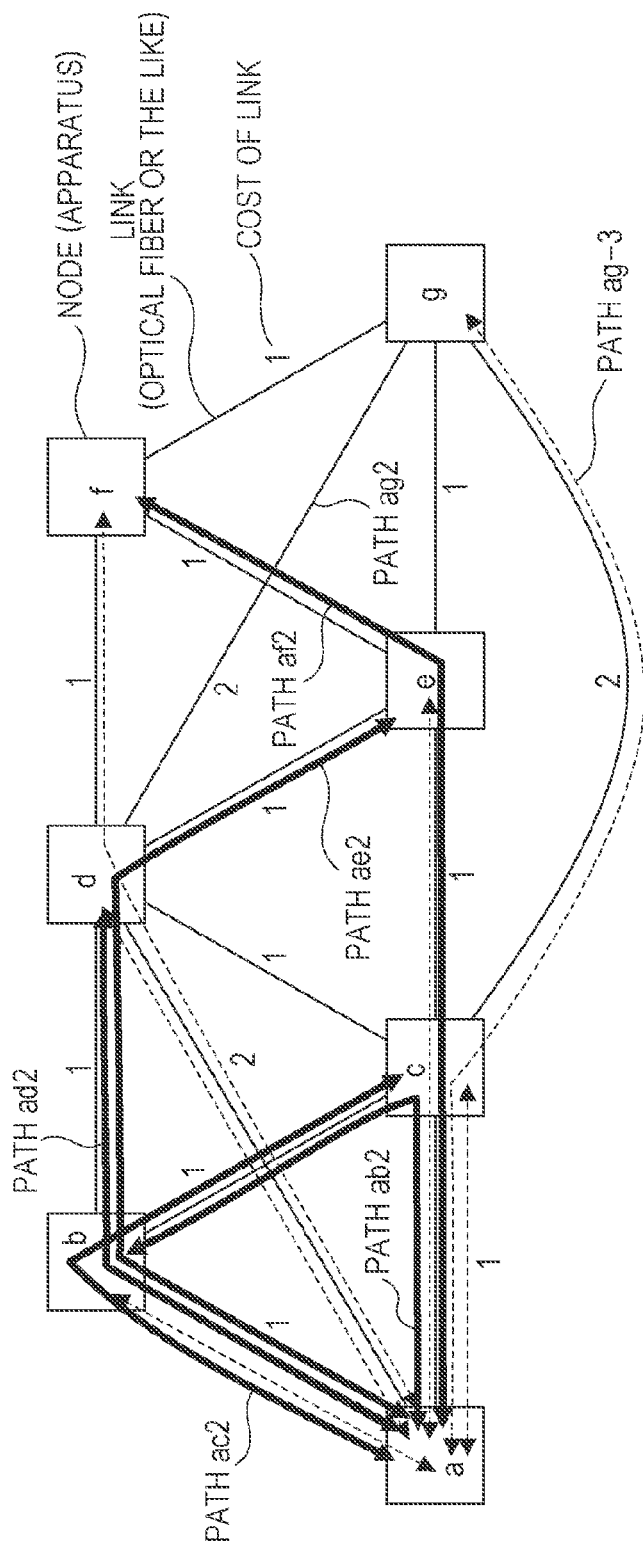
FIG. 20 is a diagram illustrating an example of a network topology for an n-th shortest path from one node to a destination node.

FIG. 20 illustrates an example of an n-th shortest path from a node to a destination node. In FIG. 20, when a node a is taken as an example, an n-th shortest path from the node a to each of all nodes b, c, d, e, f, and g other than the node a is calculated. Here let it be assumed that link costs are equal to those illustrated in FIG. 19.

In this case, an n-th shortest path between the node a and the destination node b (where n is an integer equal to or greater than 2 (hereinafter let it be assumed that n=2)) is given by a path (a-c-b) ab2 passing through the node c. An n-th shortest path between the node a and the node c is given by a path (a-b-c) ac2 passing though the node b.

An n-th shortest path between the node a and the node d is given by a path (a-b-d) ad2 passing through the node b. An n-th shortest path between the node a and the node e is given by a path (a-d-e) ae2 passing through the node d.

An n-th shortest path between the node a and the node f is given by a path (a-c-e-f) af2 passing through the node c and the node e. An n-th shortest path between the node a and the node g is given by a path (a-d-g) ag2 passing through the node d.

Note that in FIG. 20, paths represented by dotted lines indicate paths for n=1, that is, shortest paths.

Thus, setting information associated with the paths {ab2, ac2, ad2, ae2, af2, ag2} is stored in the second storage unit 35.

Redesigning of Alternative Path in a Case where a Failure Notification Occurs

Next, referring to FIGS. 21 to 24B, a description is given below as to redesigning of an alternative path in a case where a failure notification is issued as in operation P28 in FIG. 8.

Figure 21:
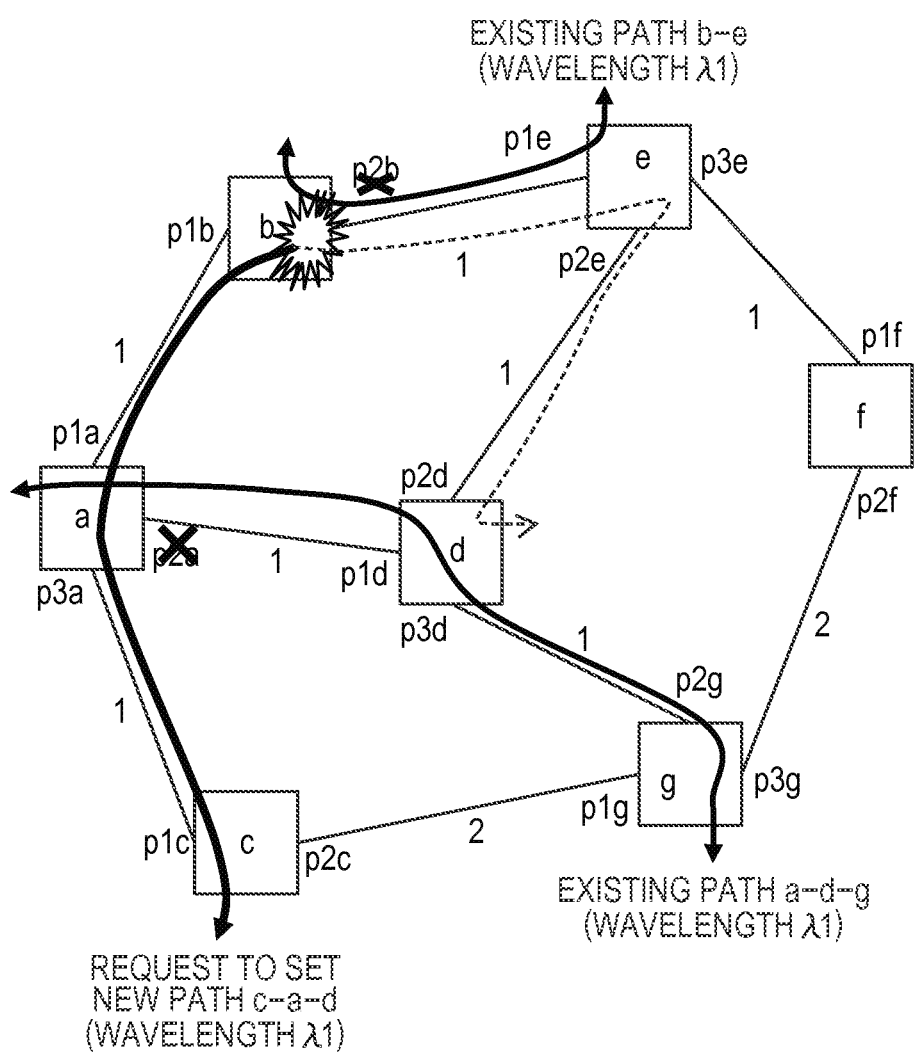
FIG. 21 is a diagram illustrating an example of a network topology for recalculation associated with connection setting information in an optical transmission apparatus illustrated by way of example in FIG. 6.
Figure 23:
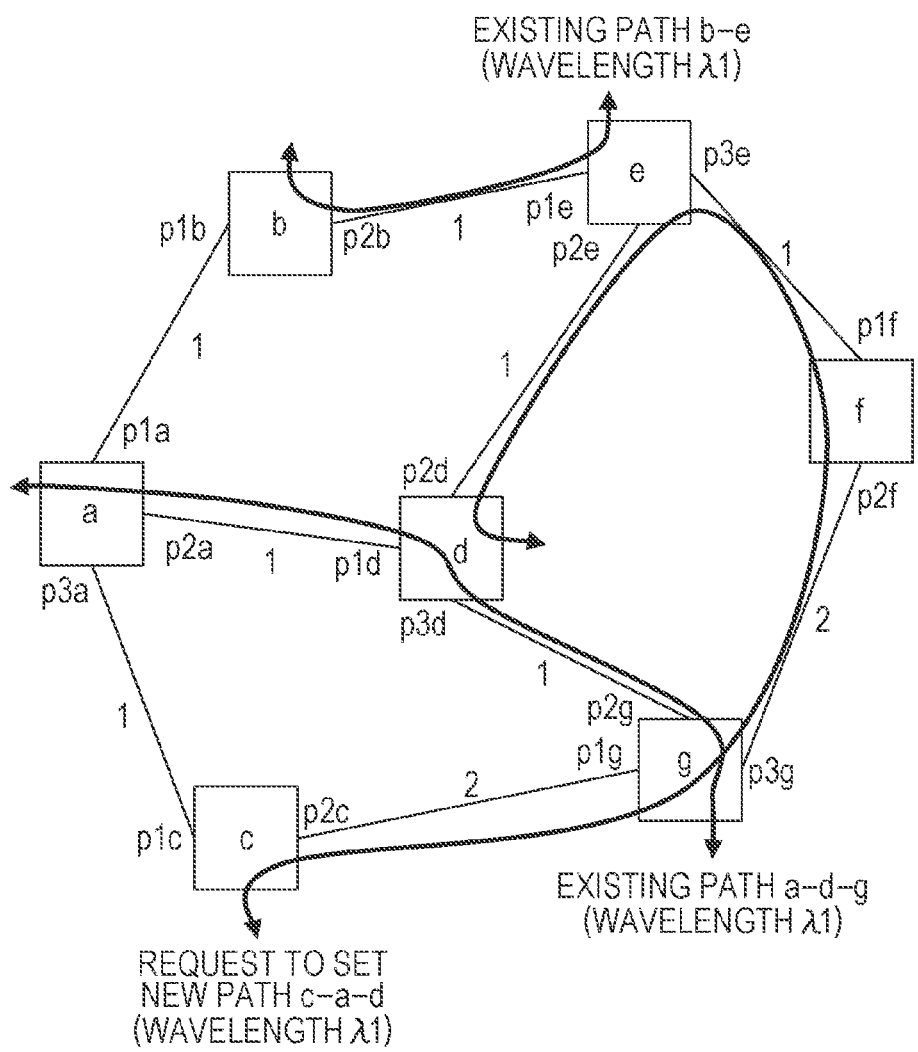
FIG. 23 is a diagram illustrating an example of a network topology for recalculation associated with connection setting information in an optical transmission apparatus illustrated by way of example in FIG. 6, according to an embodiment.

As described in FIG. 21, let it be assumed by way of example that there is an existing path (a-d-g) with a wavelength $\lambda 1$ extending between the node a and the node g and passing through the node d. Let it be also assumed by way of example that there is another existing path (b-e) with a wavelength $\lambda 1$ extending between the node b and the node e.

In this state in which there are two existing paths a-d-g and b-e, let it be assumed by way of example that a new path (c-a-d) of a wavelength $\lambda 1$ is set between the node c and the node d such that the path passes through the node a. In this case, because there are existing paths a-d-g and b-e, a collision of connection setting information occurs in both the first storage unit 34 and the second storage unit 35.

That is, at the node a, the output port for the destination node d is p2a. However, as illustrated by way of example in FIG. 22A, this output port p2a is already specified, in the first storage unit 34, for use in an existing path a-d-g (thus, a collision occurs).

Thus, at the node a, the information stored in the second storage unit 35 illustrated by way of example in FIG. 22B is checked to retrieve a value of an output port for the destination node d from the node a. As a result, an alternatively output port p1a is retrieved. Note that this output port p1a is an output port to the node b (see FIG. 21).

At the node b, the information stored in the first storage unit 34 is checked to retrieve a value of an output port for the destination node d from the node b. As a result, an output port p1b is retrieved. However, if this output port p1b is used for the new path, looping-back to the node a occurs. Thus, at the node b, the information stored in the second storage unit 35 is checked to retrieve a value of an output port for the destination node d from the node b. As a result, an output port p2b is retrieved for an alternative path to the node e.

However, this output port p2b is already specified, in the first storage unit 34, for use in the path b-e as illustrated by way of example in FIG. 22A. Thus, at the node b, the information stored in the second storage unit 35 illustrated by way of example in FIG. 22B is checked to retrieve a value of an output port assigned to the destination node d from the node b.

In this situation, the output port p2b for the destination node d from the node b is uniquely set in the example illustrated in FIG. 21, and thus also in the second storage unit 35 illustrated by way of example in FIG. 22B, the output port p2b is already assigned for use in setting of the existing path b-e.

Therefore, the path control apparatus 20 (see FIG. 1) recalculates, using the path calculation unit 21, the connection setting information stored in the first storage unit 34 and the second storage unit 35 at each node 30 for the new path c-a-d, and updates the connection setting information of each node 30 by using the path setting unit 22.

For example, the path calculation unit 21 searches for a route for the new path between the node c and the node d in the network topology illustrated by way of example in FIG. 21 under the condition that existence of the path a-d-g and the path b-e is assumed. As a result, a path c-g-f-e-d is found as illustrated by way of example in FIG. 23.

The path setting unit 22 updates the output port information stored in the first storage unit 34 for each node 30 according to the found path c-g-f-e-d as illustrated by way of example in FIG. 24A. That is, at nodes c, g, e, and d, output ports for the destination d are rewritten as follows. At the node c, an output port p2c connected to the node g is specified for the destination node d. At the node g, an output port p3g connected to the node f is specified for the destination node d. At the node e, an output port p1f connected to the node e is specified for the destination node d. At the node d, an output port p2e connected to the node d is specified for the destination node d. As may be seen from a comparison between FIG. 22A and FIG. 24B, the output port at the node c for the destination node d is changed from p1c to p2c, and the output port at the node g for the destination node d is changed from p2g to p3g.

In response to the above-described updating, the connection setting information in the second storage unit 35 is updated, for example, as illustrated in FIG. 24B. Note that in the example illustrated in FIG. 23, alternative routes to the node d are not available for any source node, and thus n/a (not applicable) is set in FIG. 24B.

In the embodiments described above, it is assumed by way of example that the nodes 30 are WDM nodes. Alternatively, nodes 30 may be circuit-switched communication nodes to achieve advantageous effects similar to those achieved in the embodiments described above.

Figure 25:
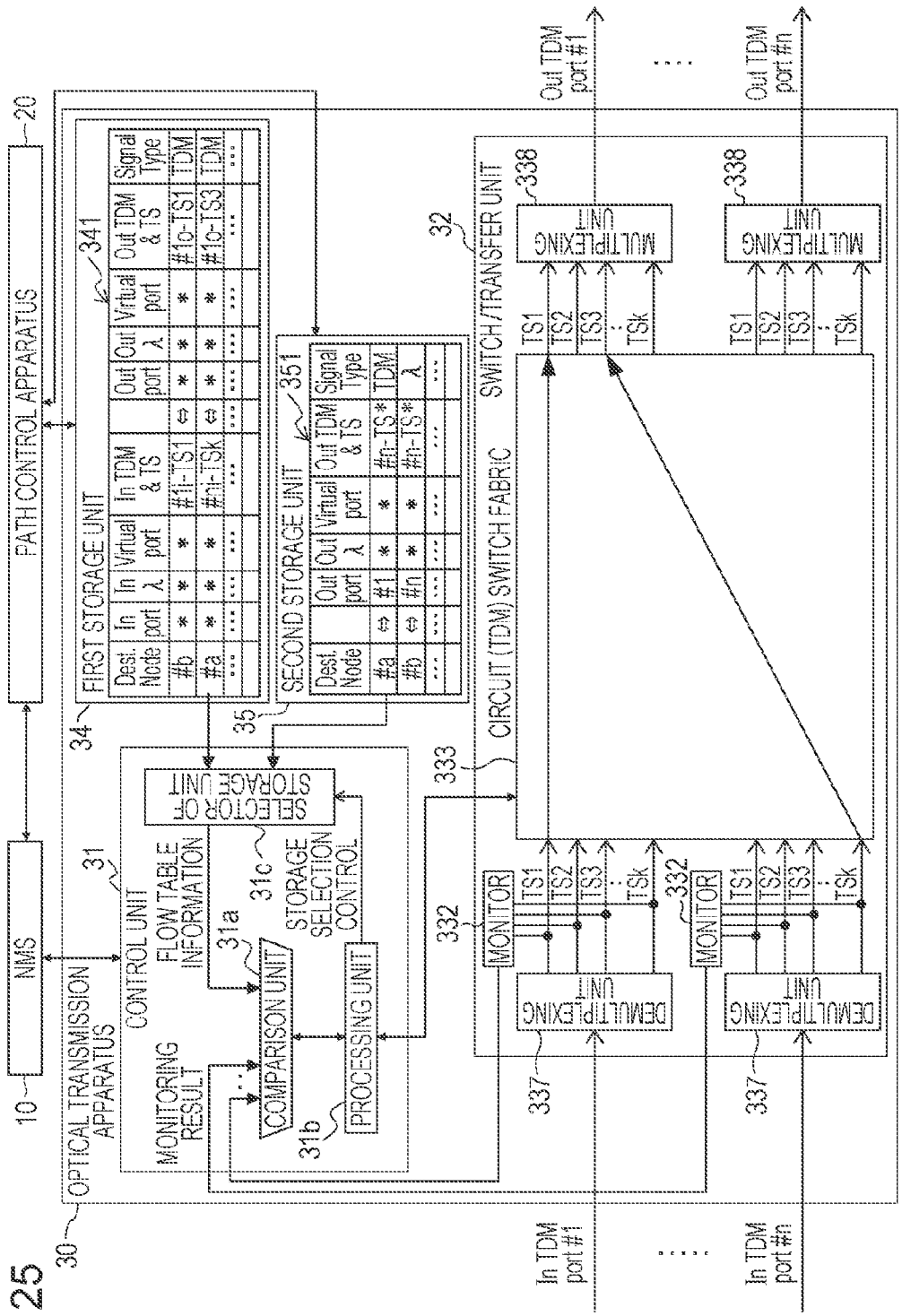
FIG. 25 is a block diagram illustrating an example of a configuration of an optical transmission apparatus obtained by applying a circuit-switched communication system to an optical transmission apparatus illustrated by way of example in FIG. 6, according to an embodiment.

FIG. 25 illustrates an example of a configuration of the node 30 based on the circuit-switched communication system. The node 30 illustrated by way of example in FIG. 25 is different in configuration from the example illustrated in FIG. 6 in that information about time slots (TS) corresponding to time-division multiplexing channels assigned to paths is set as information elements in the first and second storage units 34 and 35.

Another difference is that the switch/transfer unit 32 includes, by way of example, a monitor 332, a circuit switch fabric unit (TDM switch fabric) 333, a signal demultiplexing unit 337, and a signal multiplexing unit 338. The monitor 332 and the circuit switch fabric unit 333 each function as described above with reference to FIG. 2.

The signal demultiplexing unit 337 demultiplexes an input time-division multiplexed client signal into signals corresponding to respective TSs and supplies the resultant demultiplexed signals to the circuit switch fabric unit 333.

The signal multiplexing unit 338 time-division multiplexes client signals whose output ports are switched in units of TSs by the circuit switch fabric unit 333 and the signal multiplexing unit 338 outputs resultant multiplexed signals from the respective output ports.

Also in this embodiment, as with the previous embodiments described above, it is possible to suppress a collision among circuit-switched channel signals (TS), and thus it is possible to minimize the possibility of an occurrence of a communication failure (a telephone call loss).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
a switch unit configured to switch signal paths between a plurality of input ports and a plurality of output ports;
a storage unit configured to store connection setting information for setting the signal paths in the switch; and
a control unit configured to control the signal paths in the switch unit according to the connection setting information stored in the storage unit, wherein
the connection setting information includes:
first connection setting information that specifies a first output port to which a signal input via an input port is to be output, in association with identification information identifying the signal; and
second connection setting information that specifies a second output port to which the signal is to be alternatively output; and
the control unit is configured to control setting of a signal path of the switch unit based on the second connection setting information in a case where another signal path has been already allocated to the first output port specified by the first connection setting information.

2. The transmission apparatus of claim 1, wherein
the first and second connection setting information are defined for each destination apparatus to which the signal is to be transferred from the transmission apparatus.

3. The transmission apparatus of claim 1, wherein
the storage unit includes first and second storage units or first and second storage areas;
the first connection setting information is stored in the first storage unit or the first storage area; and
the second connection setting information is stored in the second storage unit or the second storage area.

4. The transmission apparatus of claim 1, wherein
the first and second connection setting information are defined as information for setting node disjoint paths.

5. The transmission apparatus of claim 1, wherein
the first and second connection setting information are defined as information for setting link disjoint paths.

6. The transmission apparatus of claim 1, wherein
the second connection setting information is defined as information for setting paths each designed so as to be a shortest path from the transmission apparatus to a destination apparatus.

7. The transmission apparatus of claim 1, wherein
the second connection setting information is defined as information for setting paths each designed so as to be an n-th shortest path from the transmission apparatus to a destination apparatus where n is an integer equal to or greater than 2.

8. The transmission apparatus of claim 1, wherein
the control unit is configured to issue a failure notification to a higher-level apparatus in a case where controlling of a signal path based on the second connection setting information causes the signal to be looped-back.

9. The transmission apparatus of claim 1, wherein
when controlling a signal path based on the first connection setting information, the control unit makes a determination as to whether a signal path of a signal input at the input port has already been allocated in the transmission apparatus, and
in a case where the signal path of the signal has already allocated in the transmission apparatus, the control unit issues a failure notification to a higher-level apparatus.

10. The transmission apparatus of claim 8, wherein
after the control unit issues the failure notification, the control unit updates the first and second connection setting information according to setting performed by the higher-level apparatus.

11. The transmission apparatus of claim 1, wherein
the switch unit is an optical switch fabric unit to which an optical signal is input.

12. The transmission apparatus of claim 1, wherein
the switch unit is a circuit switch fabric unit to which a circuit-switched channel signal is input.

* * * * *